United States Patent
Rajbhandari et al.

(10) Patent No.: US 11,151,986 B1
(45) Date of Patent: Oct. 19, 2021

(54) LEARNING HOW TO REWRITE USER-SPECIFIC INPUT FOR NATURAL LANGUAGE UNDERSTANDING

(71) Applicant: Amazon Technologies, Inc., Seattle, WA (US)

(72) Inventors: Bigyan Rajbhandari, Kirkland, WA (US); Praveen Kumar Bodigutla, Cambridge, MA (US); Zhenxiang Zhou, Seattle, WA (US); Karen Catelyn Stabile, Seattle, WA (US); Chenlei Guo, Redmond, WA (US); Abhinav Sethy, Seattle, WA (US); Alireza Roshan Ghias, Seattle, WA (US); Pragaash Ponnusamy, Seattle, WA (US); Kevin Quinn, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 16/138,447

(22) Filed: Sep. 21, 2018

(51) Int. Cl.
| | |
|---|---|
| G10L 15/00 | (2013.01) |
| G10L 15/18 | (2013.01) |
| G10L 15/30 | (2013.01) |
| G10L 15/22 | (2006.01) |

(52) U.S. Cl.
CPC .......... *G10L 15/1815* (2013.01); *G10L 15/22* (2013.01); *G10L 15/30* (2013.01); *G10L 2015/223* (2013.01)

(58) Field of Classification Search
CPC ............... G10L 15/1815; G10L 15/22; G10L 2015/223; G10L 2015/228; G10L 15/30
USPC .................................. 704/257, 270, 275
See application file for complete search history.

(56) References Cited

U.S. PATENT DOCUMENTS

| | | | |
|---|---|---|---|
| 5,231,670 A * | 7/1993 | Goldhor | G06F 3/16 704/275 |
| 8,825,474 B1 * | 9/2014 | Zhai | G06F 40/20 704/9 |
| 8,965,763 B1 * | 2/2015 | Chelba | G10L 15/063 704/231 |

(Continued)

*Primary Examiner* — Daniel Abebe
(74) *Attorney, Agent, or Firm* — Pierce Atwood LLP

(57) ABSTRACT

Techniques for decreasing (or eliminating) the possibility of a skill performing an action that is not responsive to a corresponding user input are described. A system may train one or more machine learning models with respect to user inputs, which resulted in incorrect actions being performed by skills, and corresponding user inputs, which resulted in the correct action being performed. The system may use the trained machine learning model(s) to rewrite user inputs that, if not rewritten, may result in incorrect actions being performed. The system may implement the trained machine learning model(s) with respect to ASR output text data to determine if the ASR output text data corresponds (or substantially corresponds) to previous ASR output text data that resulted in an incorrect action being performed. If the trained machine learning model(s) indicates the present ASR output text data corresponds (or substantially corresponds) to such previous ASR output text data, the system may rewrite the present ASR output text data to correspond to text data representing a rephrase of the user input that will (or is more likely to) result in a correct action being performed.

20 Claims, 12 Drawing Sheets

(56) References Cited

U.S. PATENT DOCUMENTS

| | | | |
|---|---|---|---|
| 9,318,128 B1* | 4/2016 | Epstein | G10L 21/10 |
| 9,679,568 B1* | 6/2017 | Taubman | G10L 15/30 |
| 9,740,751 B1* | 8/2017 | Yeom | G06F 16/24578 |
| 10,297,254 B2* | 5/2019 | Ni | G10L 15/1815 |
| 2001/0023397 A1* | 9/2001 | Tajima | G10L 15/26 704/231 |
| 2006/0167676 A1* | 7/2006 | Plumb | G06F 40/232 704/6 |
| 2007/0219786 A1* | 9/2007 | Isaac | G10L 15/22 704/201 |
| 2007/0225980 A1* | 9/2007 | Sumita | G10L 15/1815 704/240 |
| 2007/0233497 A1* | 10/2007 | Paek | G10L 15/22 704/270 |
| 2011/0184730 A1* | 7/2011 | LeBeau | G10L 15/30 704/201 |
| 2012/0303371 A1* | 11/2012 | Labsky | G10L 13/08 704/260 |
| 2013/0035939 A1* | 2/2013 | Gilbert | G10L 15/063 704/254 |
| 2013/0262117 A1* | 10/2013 | Heckmann | G10L 15/22 704/255 |
| 2014/0195226 A1* | 7/2014 | Yun | G10L 15/01 704/231 |
| 2015/0019074 A1* | 1/2015 | Winter | B60K 37/06 701/36 |
| 2015/0269938 A1* | 9/2015 | Lloyd | G10L 15/183 704/235 |
| 2016/0328205 A1* | 11/2016 | Agrawal | G10L 25/48 |
| 2017/0351532 A1* | 12/2017 | Li | G06F 9/4843 |
| 2018/0067920 A1* | 3/2018 | Cho | G06F 40/242 |
| 2018/0102914 A1* | 4/2018 | Kawachi | H04L 12/283 |
| 2019/0066681 A1* | 2/2019 | Hsu | B66B 1/461 |
| 2019/0088251 A1* | 3/2019 | Mun | G10L 15/187 |
| 2019/0115027 A1* | 4/2019 | Shah | G10L 15/16 |
| 2019/0206389 A1* | 7/2019 | Kwon | G10L 15/22 |
| 2019/0287533 A1* | 9/2019 | Homma | G10L 15/22 |
| 2020/0160880 A1* | 5/2020 | Caskey | G09B 19/04 |

* cited by examiner

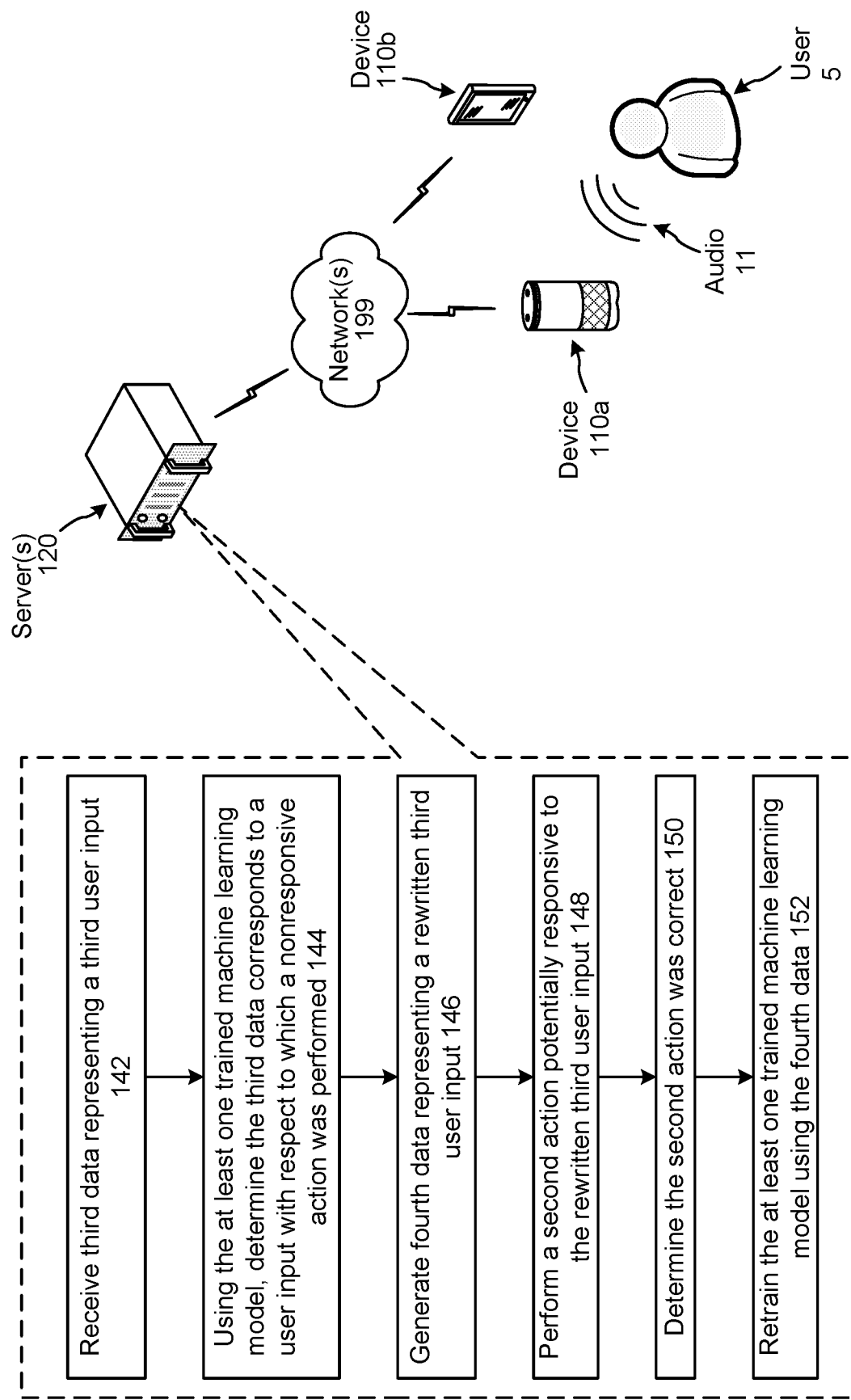

Narrow Down

ASR Hypothesis: "play four a.m."

Alternate ASR Hypothesis: "play four a.m. by hunter"

---

Generalization

ASR Hypothesis: "when was the worst flu epidemic in the U.S."

Alternate ASR Hypothesis: "flu epidemic in the U.S."

---

Slip of Tongue

ASR Hypothesis: "forecast for appellee Georgia"

Alternate ASR Hypothesis: "forecast for Appling Georgia"

---

Phrase Reformulation

ASR Hypothesis: "change the dish to channel thirteen"

Alternate ASR Hypothesis: "turn the channel to thirteen"

LEARNING HOW TO REWRITE USER-SPECIFIC INPUT FOR NATURAL LANGUAGE UNDERSTANDING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B illustrates a system configured to rewrite user inputs according to embodiments of the present disclosure.

FIG. 7 is a conceptual diagram illustrating types of user input rewriting that may be performed at runtime according to embodiments of the present disclosure.

DETAILED DESCRIPTION

Figure 1A:
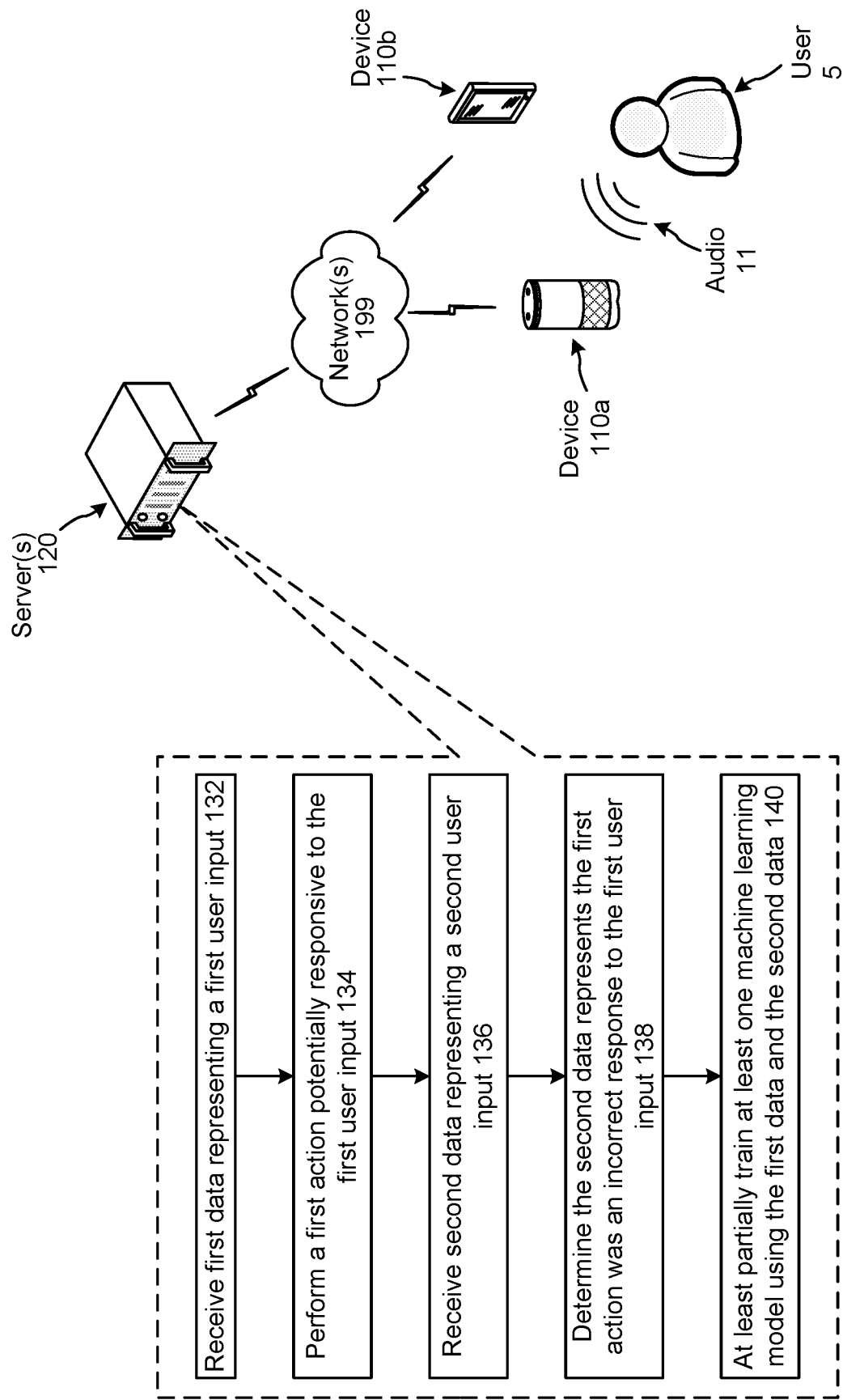
FIG. 1A illustrates a system configured to use user feedback to train at least one machine learning model to rewrite user inputs according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, book me a ride to the airport," a system may schedule a car ride to the airport with a ride sharing service.

A system may receive a user input as speech. For example, a user may speak an input to a device. The device may send audio data, representing the spoken input, to a server(s). The server(s) may perform ASR processing on the audio data to generate text data representing the user input. The server(s) may perform NLU processing on the text data to determine an intent of the user input as well as portions of the text data that may be used by one or more skills to perform an action responsive to the user input.

As used herein, a skill, skill component, or the like may be software running on a server(s) 120 that is akin to a software application running on a traditional computing device. The functionality described herein as a skill may be referred to using many different terms, such as an action, bot, app, or the like.

In at least some examples, a "skill," "skill component," and the like may be software running on a computing device, similar to a traditional software application running on a computing device. Such skill may include a voice user interface in addition to or instead of, in at least some instances, a graphical user interface, smart home device interface, and/or other type of interface.

In at least some examples, a "skill," "skill component," and the like may be software that is run by a third party, to the herein disclosed system, without the third party provisioning or managing one or more servers for executing the skill. In such an implementation, the system may be triggered to run a skill in response to the third party calling the system via the Internet or a mobile application. Such implementation may include, but is not limited to, Amazon's AWS Lambda.

In at least some examples, a "skill," "skill component," and the like may be securely run by a third party, to the herein disclosed system, without the third party's device(s) being connected to the Internet. Internet of Things (IoT) devices of a third party may use, for example Amazon's AWS lambda functions, to interact with system resources and transmit data to the system (which may, in at least some implementations, be configured by the backend or other type of remote system). Such implementation may include, but is not limited to, Amazon's AWS Greengrass. For example, AWS Greengrass may extend the herein disclosed system to IoT devices so such devices can act locally on data they generate, while still using the herein disclosed system for data management, analytics, and storage.

During processing of a user input, situations may occur that cause a skill to perform an action that is not properly responsive to a user input. For example, a user input may request music of a certain artist be output, but the skill may cause music of a different artist to be output. For further example, a user input may request the output of weather information for a particular city in a particular state, but the skill may cause weather information for a city, having the same name but in a different state, to be output.

In an example, a skill may perform an incorrect action in response to ASR processing outputting incorrect text data (e.g., text data that is not an accurate transcription of a spoken user input). In another example, a skill may perform an incorrect action in response to NLU processing outputting incorrect NLU results (e.g., outputting an incorrect intent and/or identifying portions of text data that are not usable by the skill to perform an action responsive to the user input).

The present disclosure reduces friction between users and systems by configuring such systems to rewrite user-specific inputs for NLU processing. For example, when a system is unable to understand a user's input, the system may respond with "sorry, I do not know that" or may do something unrelated to the user input. The present disclosure leverages user interaction patterns, user feedback, and other data inputs to continuously and automatically improve the systems' understanding of user inputs.

The present disclosure improves such systems to decrease (or eliminate) the possibility of a skill performing an action that is not responsive to a corresponding user input. The present disclosure provides a mechanism that may use user feedback to (i) detect when a skill has performed an action not responsive to a user input and (ii) correct such action so same happens with respect to future user inputs with less occurrence. User feedback may be explicit or implicit.

Explicit user feedback refers, at least in part, to subsequent user inputs that explicitly indicate a performed action was not responsive to a corresponding user input. In an example, a user may say "play music by Adele" and the system may output music by an artist other than Adele. In response to the system outputting such music, the user may provide a subsequent input corresponding to "stop," "cancel," or the like. The foregoing subsequent user input may be considered an explicit user feedback.

Implicit user feedback refers, at least in part, to subject user inputs that implicitly indicate a performed action was not responsive to a corresponding user input. In an example, a user may say "play music by Adele" and the system may output music by an artist other than Adele. In response to the system outputting such music, the user may provide a subsequent input that rephrases the previous user input. Using the above example, a rephrased user input may correspond to "play music by the artist Adele," "play Adele music," or the like. Such rephrases may be considered implicit user feedback.

A system may train one or more machine learning models with respect to user inputs, which resulted in incorrect actions being performed by skills, and corresponding user inputs, which resulted in the correct action being performed. The system may use the trained machine learning model(s) to rewrite user inputs that, if not rewritten, may result in incorrect actions being performed. The system may implement the trained machine learning model(s) with respect to ASR output text data to determine if the ASR output text data corresponds (or substantially corresponds) to previous ASR output text data that resulted in an incorrect action being performed. If the trained machine learning model(s) indicates the present ASR output text data corresponds (or substantially corresponds) to such previous ASR output text data, the system may rewrite the present ASR output text data to correspond to text data representing a rephrase of the user input that will (or is more likely to) result in a correct action being performed.

Teachings of the present disclosure have several benefits. For example, teachings of the present disclosure decrease a likelihood of a system performing an action that is not responsive to a corresponding user input. Teachings of the present disclosure achieve this benefit by, for example, fixing ASR transcription errors, disambiguating entities identified during named entity recognition processing (which is a part of NLU processing described herein), fixing slot classification errors resulting during NLU processing, intent classification errors resulting from intent classification processing, skill processing errors, and user errors (e.g., user inadvertently speaks a user input in an incorrect manner, commonly referred to as slip of the tongue).

Teachings of the present disclosure may be ordinarily configured to be opt-in features of a system. For example, while a system may be configured to perform the teachings herein, the system may not perform such teachings with respect to a user unless the user has explicitly provided permission for the system to perform the teachings herein with respect to the user. In addition, a system may be configured to enable a user to opt-out of the teachings herein, resulting in the system no longer performing the teachings herein with respect to that user. In addition, such opting out by a user may result in the system no longer using that user's data to perform the teachings herein with respect to one or more other users of the system. As such, it will be appreciated that a user may have significant control over when a system uses that user's data.

FIG. 1A illustrates a system configured to use user feedback to train at least one machine learning model to rewrite user inputs. FIG. 1B illustrates a system configured to rewrite user inputs. Although the figures and discussion herein illustrate certain operational steps of the system in a particular order, the steps described may be performed in a different order (as well as certain steps removed or added) without departing from the intent of the disclosure. As illustrated in FIGS. 1A and 1, the system may include one or more devices (110a/110b) local to a user 5 and one or more servers 120 connected across one or more networks 199.

Referring to FIG. 1A, the device 110a may receive audio 11 representing a spoken user input of the user 5. The device 110a may generate audio data representing the audio 11 and send the audio data to the server(s) 120, which the server(s) 120 receives (132). Alternatively, the device 110b may receive a text input representing a text-based user input of the user 5. The device 110b may generate text data representing the text input and may send the text data to the server(s) 120, which the server(s) 120 receives (132).

Depending on configuration, the device (110a/110b) may send audio data or text data to the server(s) 120 via a companion application installed on the device (110a/110b). The companion application may enable the device 110 to communicate with the server(s) 120 via the network(s) 199. An example of a companion application is the Amazon Alexa application that operates on a phone/tablet.

The server(s) 120 may perform (134) an action potentially responsive to the user input. If the user input is received as audio data, the server(s) 120 may perform ASR processing on the audio data to generate text data. The server(s) 120 may perform NLU processing on text data (either as received at step 132 or as output from ASR processing) to determine the action to be performed. The action may correspond to the outputting of content (e.g., music, weather information, etc.) or may correspond to the performance of some other action (e.g., booking of a reservation, creation of an electronic calendar event, setting of a timer, etc.)

At least partially contemporaneous to the action being performed, or after the action is performed, the device (110a/110b) may receive a subsequent user input. The device (110a/110b) may send data representing the subsequent user input to the server(s) 120, which the server(s) 120 receives (136).

The server(s) 120 may determine (138) the subsequent user input represents the action is or was not a correct response to the initial user input. For example, the server(s) 120 may determine the subsequent user input corresponds to explicit user feedback (e.g., may determine the subsequent user input explicitly indicates the action is or was not a correct response to the initial user input). For further example, the server(s) 120 may determine the subsequent user input corresponds to implicit user feedback (e.g., may determine the subsequent user input corresponds to a rephrasing of the initial user input). The server(s) 120 may at least partially train (140) at least one machine learning model, using the original user input and the subsequent user input, to detect when future user inputs should be rewritten.

Referring to FIG. 1B, sometime after the server(s) 120 trains the at least one machine learning model, the server(s) 120 may receive (142) data representing a user input. The server(s) 120 may use (144) the trained one or more machine learning models to determine the user input corresponds to a user input with respect to which a nonresponsive action was performed.

The server(s) 120 may generate (146) data representing a rewritten form of the user input received at step 142. For example, the user inputs received at step 142 may correspond to "what is the weather in Petersburg." The server(s) 120 may have previously output weather information for a city named "Petersburg" located closest to the device (110a/110b) when the user intended the system to output weather information for a different Petersburg (e.g., Petersburg, Ak.). With respect to the previous system output, the server(s) 120 may have received a rephrase of the user input corresponding to "what is the weather in Petersburg, Alaska." Based on these previous user/system interactions, the server(s) 120 may rewrite the user input to correspond to "what is the weather in Petersburg" (received at step 144) to correspond to "what is the weather in Petersburg, Alaska."

The server(s) 120 may perform (148) an action potentially responsive to the rewritten user input. The server(s) 120 may determine (150) the action, performed in response to the rewritten user input, was correct. Such determination may be based, at least in part, on explicit user feedback and/or implicit user feedback. The server(s) 120 may retrain (152) the at least one trained machine learning model using the determination that the action, performed in response to the rewritten user input, was correct.

Steps 132 through 152 may be performed with respect to various user inputs received by the server(s) 120. Thus, one skilled in the art will appreciate that the number of user inputs that may be correctly rewritten by the server(s) 120 may grow as user inputs and associated user feedback are received and processed by the server(s) 120.

Figure 2:
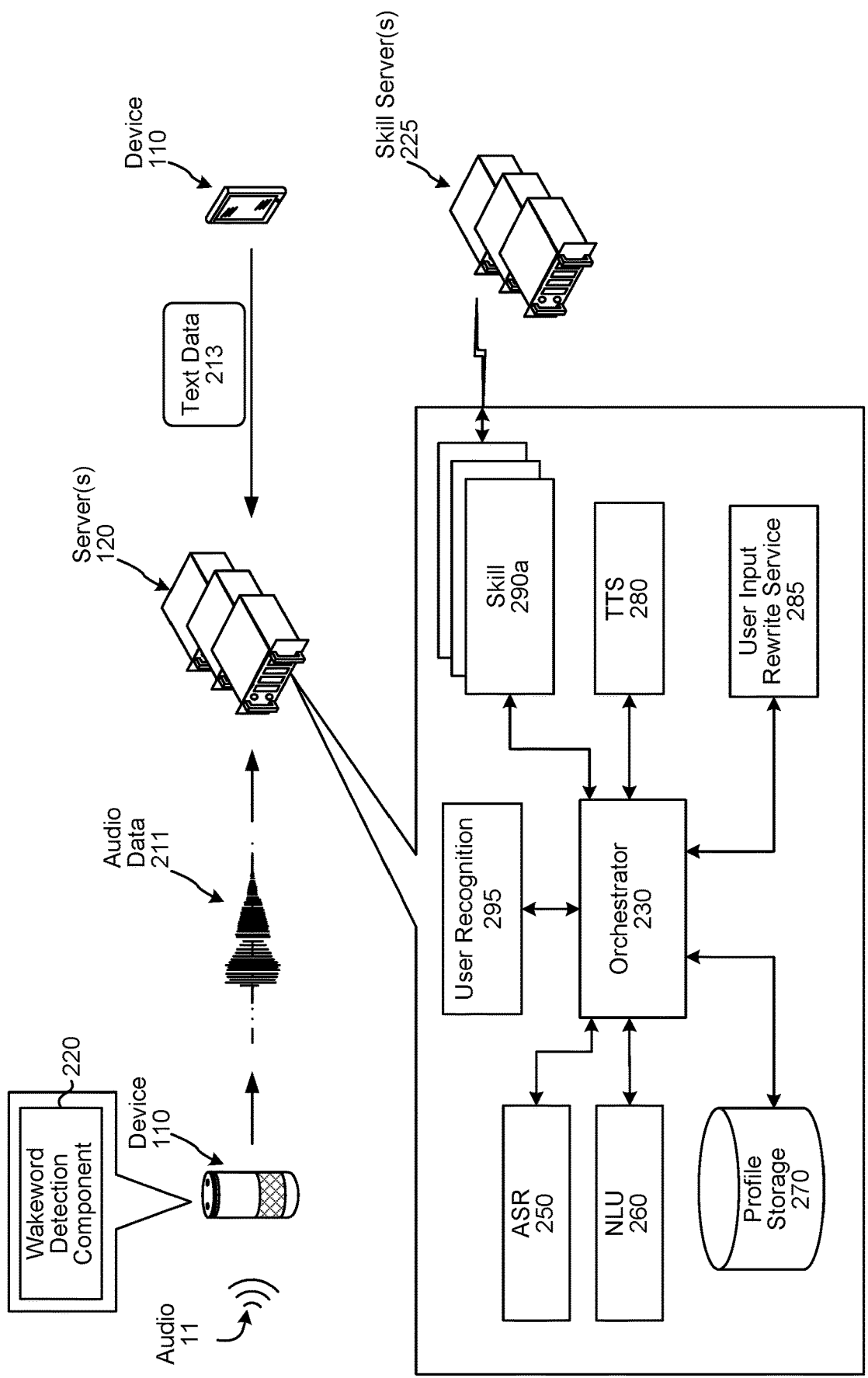
FIG. 2 is a conceptual diagram of components of a system according to embodiments of the present disclosure.

The system may operate using various components as illustrated in FIG. 2. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the server(s) 120. The audio data 211 may include data corresponding to the wakeword, or the portion of the audio data 211 corresponding to the wakeword may be removed by the device 110 prior to sending the audio data 211 to the server(s) 120.

Upon receipt by the server(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to an ASR component 250. The ASR component 250 transcribes the audio data 211 into text data potentially representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data output by the ASR component 250 may include a top scoring ASR hypothesis or may include multiple ASR hypotheses. Each ASR hypothesis may be associated with a respective score representing a confidence of ASR processing performed to generate the ASR hypothesis with which the score is associated.

The device 110 may send text data 213 to the server(s) 120. Upon receipt by the server(s) 120, the text data 213 may be sent to the orchestrator component 230, which may send the text data 213 to the NLU component 260.

The NLU component 260 attempts to make a semantic interpretation of the phrase(s) or statement(s) represented in the text data input therein. That is, the NLU component 260 determines one or more meanings associated with the user input represented in the text data based on one or more words represented in the text data. The NLU component 260 determines an intent representing an action that a user desires be performed as well as pieces of the text data that allow a device (e.g., the device 110, the server(s) 120, a skill 290, a skill server(s) 225, etc.) to execute the intent. For example, if the text data corresponds to "play Adele music," the NLU component 260 may determine an intent that the system output music and may identify "Adele" as an artist. For further example, if the text data corresponds to "what is the weather," the NLU component 260 may determine an intent that the system output weather information associated with a geographic location of the device 110 (or a geographic location represented in a user profile). In another example, if the text data corresponds to "turn off the lights," the NLU component 260 may determine an intent that the system turn off lights associated with the device 110 (or another device represented in a user profile).

The NLU component 260 may send NLU results data (which may include tagged text data, indicators of intent, etc.) to the orchestrator component 230. The orchestrator component 230 may send the NLU results data to a skill(s) 290 configured to perform an action believed at least partially responsive the user input. The NLU results data may include a single NLU hypothesis, or may include multiple NLU hypotheses. An NLU hypothesis may correspond to an intent indicator and corresponding tagged text data.

A "skill" may be software running on the server(s) 120 that is akin to a software application running on a traditional computing device. That is, a skill 290 may enable the server(s) 120 to execute specific functionality in order to provide data or produce some other requested output. The server(s) 120 may be configured with more than one skill 290. For example, a weather service skill may enable the server(s) 120 to provide weather information, a car service skill may enable the server(s) 120 to book a trip with respect to a taxi or ride sharing service, a restaurant skill may enable the server(s) 120 to order a pizza with respect to the restaurant's online ordering system, etc. A skill 290 may operate in conjunction between the server(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the server(s) 120, a skill 290 may be implemented at least partially by a skill server(s) 225. Such may enable a skill server(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The server(s) 120 may be configured with a single skill 290 dedicated to interacting with more than one skill server 225. The server(s) 120 may be configured with a skill 290 that communicates with more than one type of device (e.g., different types of home automation devices).

Unless expressly stated otherwise, reference to a skill, skill device, or skill component may include a skill 290 operated by the server(s) 120 and/or the skill server(s) 225. Moreover, the functionality described herein as a skill may be referred to using many different terms, such as an action, bot, app, or the like.

The server(s) 120 may include a TTS component 280 that generates audio data (e.g., synthesized speech) from text data using one or more different methods. Text data input to the TTS component 280 may come from a skill 290, the orchestrator component 230, or another component of the system.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The server(s) 120 may include profile storage 270. The profile storage 270 may include a variety of information related to individual users, groups of users, devices, etc. that interact with the system. A "profile" refers to a set of data associated with a user, device, etc. A profile may include preferences specific to a user, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices of the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with users corresponding to a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device identifiers representing one or more devices associated with the group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The herein disclosed system and techniques can be implemented on a geographic basis to ensure compliance with laws in various jurisdictions and entities in which the components of the system and/or user(s) are located.

The server(s) 120 may include a user recognition component 295 that recognizes one or more users associated with data input to the system. The user recognition component 295 may take as input the audio data 211. The user recognition component 295 may perform user recognition by comparing audio characteristics in the audio data 211 to stored audio characteristics of users. The user recognition component 295 may also or alternatively perform user recognition by comparing biometric data (e.g., fingerprint data, iris data, etc.), received by the system in correlation with the present user input, to stored biometric data of users. The user recognition component 295 may also or alternatively perform user recognition by comparing image data (e.g., including a representation of at least a feature of a user), received by the system in correlation with the present user input, with stored image data including representations of features of different users. The user recognition component 295 may perform additional user recognition processes, including those known in the art. For a particular user input, the user recognition component 295 may perform processing with respect to stored data of users associated with the device 110 that captured the user input.

The user recognition component 295 determines whether user input originated from a particular user. For example, the user recognition component 295 may generate a first value representing a likelihood that the user input originated from a first user, a second value representing a likelihood that the user input originated from a second user, etc. The user recognition component 295 may also determine an overall confidence regarding the accuracy of user recognition operations.

The user recognition component 295 may output a single user identifier corresponding to the most likely user that originated the user input, or may output multiple user identifiers with respective values representing likelihoods of respective users originating the user input. The output of the user recognition component 295 may be used to inform NLU processing, processing performed by a skill 290, as well as processing performed by other components of the system.

Figure 3:
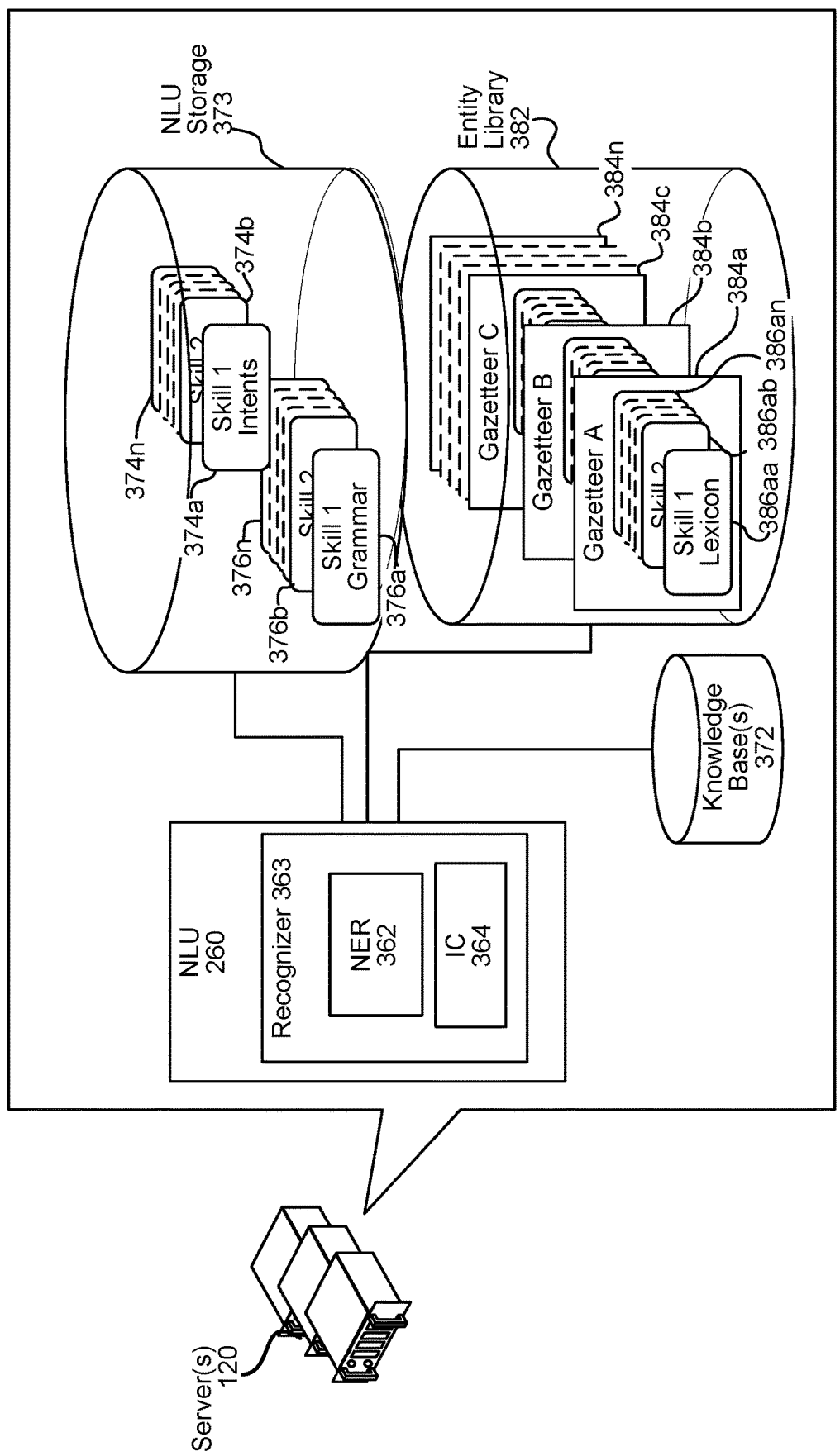
FIG. 3 is a conceptual diagram illustrating how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, skill server(s) 225, etc.) to complete that action.

The NLU component 260 may process text data including several ASR hypotheses. The NLU component 260 may process all (or a portion of) the ASR hypotheses input therein. Even though the ASR component 250 may output multiple ASR hypotheses, the NLU component 260 may be configured to only process with respect to the top scoring ASR hypothesis.

The NLU component 260 may include one or more recognizers 363. Each recognizer 363 may be associated with a different skill 290. Each recognizer 363 may process with respect to text data input to the NLU component 260. Each recognizer 363 may operate at least partially in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a skill 290. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include skill-indexed lexical information associated with a particular user and/or device 110. For example, a Gazetteer A (384a) includes skill-indexed lexical information 386aa to 386an. A user's music skill lexical information might include album titles, artist names, and song names, for example, whereas a user's contact list skill lexical information might include the names of contacts. Since every user's music collection and contact list is presumably different, this personalized information improves entity resolution.

An NER component 362 applies grammar models 376 and lexical information 386 to determine a mention of one or more entities in text data. In this manner, the NER component 362 identifies "slots" (corresponding to one or more particular words in text data) that may be used for later processing. The NER component 362 may also label each slot with a type (e.g., noun, place, city, artist name, song name, etc.).

Each grammar model 376 includes the names of entities (i.e., nouns) commonly found in speech about the particular skill 290 to which the grammar model 376 relates, whereas the lexical information 386 is personalized to the user and/or the device 110 from which the user input originated. For example, a grammar model 376 associated with a shopping skill may include a database of words commonly used when people discuss shopping.

Each recognizer 363 may also include an intent classification (IC) component 364. An IC component 364 parses text data to determine an intent(s). An intent represents an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374.

The intents identifiable by a specific IC component 364 are linked to skill-specific grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (e.g., implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb, which an IC component 364 may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 372). For example, if the text data includes "play songs by the rolling stones," after failing to determine an album name or song name called "songs" by "the rolling stones," the NER component 362 may search the database for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {skill} Music, {intent}<PlayMusic>, {artist name} rolling stones, {media type} SONG, and {song title} mother's little helper. For further example, the NER component 362 may tag "play songs by the rolling stones" as: {skill} Music, {intent}<PlayMusic>, {artist name} rolling stones, and {media type} SONG.

Figure 4:
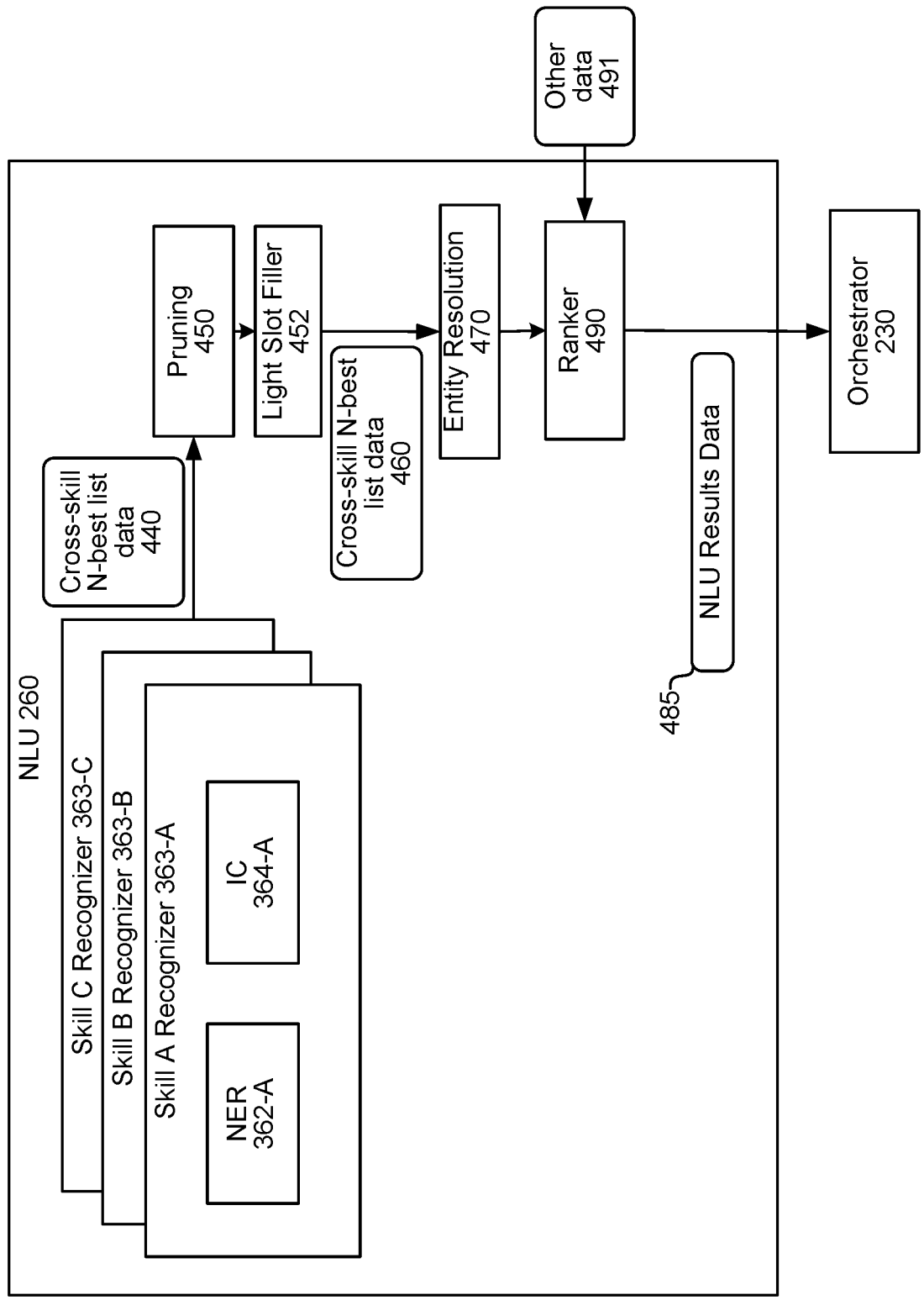
FIG. 4 is a conceptual diagram illustrating how natural language understanding processing is performed according to embodiments of the present disclosure.

The NLU component 260 may generate cross-skill N-best list data 440, which may include a list of NLU hypotheses output by each recognizer 363 (as illustrated in FIG. 4). A recognizer 363 may output tagged text data generated by an NER component 362 and an IC component 364 operated by the recognizer 363, as described above. Each NLU hypothesis including an intent indicator and text/slots may be grouped as an NLU hypothesis represented in the cross-skill N-best list data 440. Each NLU hypothesis may also be associated with one or more respective score(s) for the NLU hypothesis. For example, the cross-skill N-best list data 440 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The NLU component 260 may send the cross-skill N-best list data 440 to a pruning component 450. The pruning component 450 may sort the NLU hypotheses represented in the cross-skill N-best list data 440 according to their respective scores. The pruning component 450 may then perform score thresholding with respect to the cross-skill N-best list data 440. For example, the pruning component 450 may select NLU hypotheses represented in the cross-skill N-best list data 440 associated with confidence scores satisfying (e.g., meeting and/or exceeding) a threshold confidence score. The pruning component 450 may also or alternatively perform number of NLU hypothesis thresholding. For example, the pruning component 450 may select a maximum threshold number of top scoring NLU hypotheses. The pruning component 450 may generate cross-skill N-best list data 460 including the selected NLU hypotheses. The purpose of the pruning component 450 is to create a reduced list of NLU hypotheses so that downstream, more resource intensive, processes may only operate on the NLU hypotheses that most likely represent the user's intent.

The NLU component 260 may also include a light slot filler component 452. The light slot filler component 452 can take text data from slots represented in the NLU hypotheses output by the pruning component 450 and alter it to make the text data more easily processed by downstream components. The light slot filler component 452 may perform low latency operations that do not involve heavy operations, such as those requiring reference to a knowledge base. The purpose of the light slot filler component 452 is to replace words with other words or values that may be more easily understood by downstream system components. For example, if an NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-skill N-best list data 460.

The NLU component 260 sends the cross-skill N-best list data 460 to an entity resolution component 470. The entity resolution component 470 can apply rules or other instructions to standardize labels or tokens from previous stages into an intent/slot representation. The precise transformation may depend on the skill 290. For example, for a travel skill, the entity resolution component 470 may transform text data corresponding to "Boston airport" to the standard BOS three-letter code referring to the airport. The entity resolution component 470 can refer to a knowledge base that is used to specifically identify the precise entity referred to in each slot of each NLU hypothesis represented in the cross-skill N-best list data 460. Specific intent/slot combinations may also be tied to a particular source, which may then be used to resolve the text data. In the example "play songs by the stones," the entity resolution component 470 may reference a personal music catalog, Amazon Music account, user profile data, or the like. The entity resolution component 470 may output text data including an altered N-best list that is based on the cross-skill N-best list data 460, and that includes more detailed information (e.g., entity IDs) about the specific entities mentioned in the slots and/or more detailed slot data that can eventually be used by downstream components to perform an action responsive to the user input. The NLU component 260 may include multiple entity resolution components 470 and each entity resolution component 470 may be specific to one or more skills 290.

The entity resolution component 270 may not be successful in resolving every entity and filling every slot represented in the cross-skill N-best list data 460. This may result in the entity resolution component 470 outputting incomplete results.

The NLU component 260 may include a ranker component 490. The ranker component 490 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill includes slots that are all filled/resolved, that NLU hypothesis may be assigned a higher confidence score than another NLU hypothesis including at least some slots that are unfilled/unresolved by the entity resolution component 470.

The ranker component 490 may apply re-scoring, biasing, and/or other techniques to determine the top scoring NLU hypotheses. To do so, the ranker component 490 may consider not only the data output by the entity resolution component 470, but may also consider other data 491. The other data 491 may include a variety of information. The other data 491 may include skill 490 rating or popularity data. For example, if one skill 290 has a particularly high rating, the ranker component 490 may increase the score of an NLU hypothesis associated with that skill 290, and vice versa. The other data 491 may include information about skills 290 that have been enabled for the user identifier and/or device identifier associated with the current user input. For example, the ranker component 490 may assign higher scores to NLU hypotheses associated with enabled skills 290 than NLU hypotheses associated with non-enabled skills 290. The other data 491 may include data indicating user usage history, such as if the user identifier associated with the current user input is regularly associated with user inputs that invoke a particular skill 290 or does so at particular times of day. The other data 491 may include data indicating date, time, location, weather, type of device 110, user identifier, device identifier, context, as well as other information. For example, the ranker component 490 may consider when any particular skill 290 is currently active (e.g., music being played, a game being played, etc.) with respect to the user or device 110 associated with the current user input. The other data 491 may include device type information. For example, if the device 110 does not include a display, the ranker component 490 may decrease the score associated with an NLU hypothesis that would result in displayable content being presented to a user, and vice versa.

Following ranking by the ranker component 490, the NLU component 260 may output NLU results data 485 to the orchestrator component 230. The NLU results data 485 may include the top scoring NLU hypotheses as determined by the ranker component 490. Alternatively, the NLU results data 485 may include the top scoring NLU hypothesis as determined by the ranker component 490.

The orchestrator component 230 may select a skill 290, based on the NLU results data 485, for performing an action responsive to the user input. In an example, the orchestrator component 230 may send all (or a portion of) the NLU results data 485 to a skill 290 that is represented in the NLU results data 485 and to be invoked to perform an action responsive to the user input.

Figure 5:
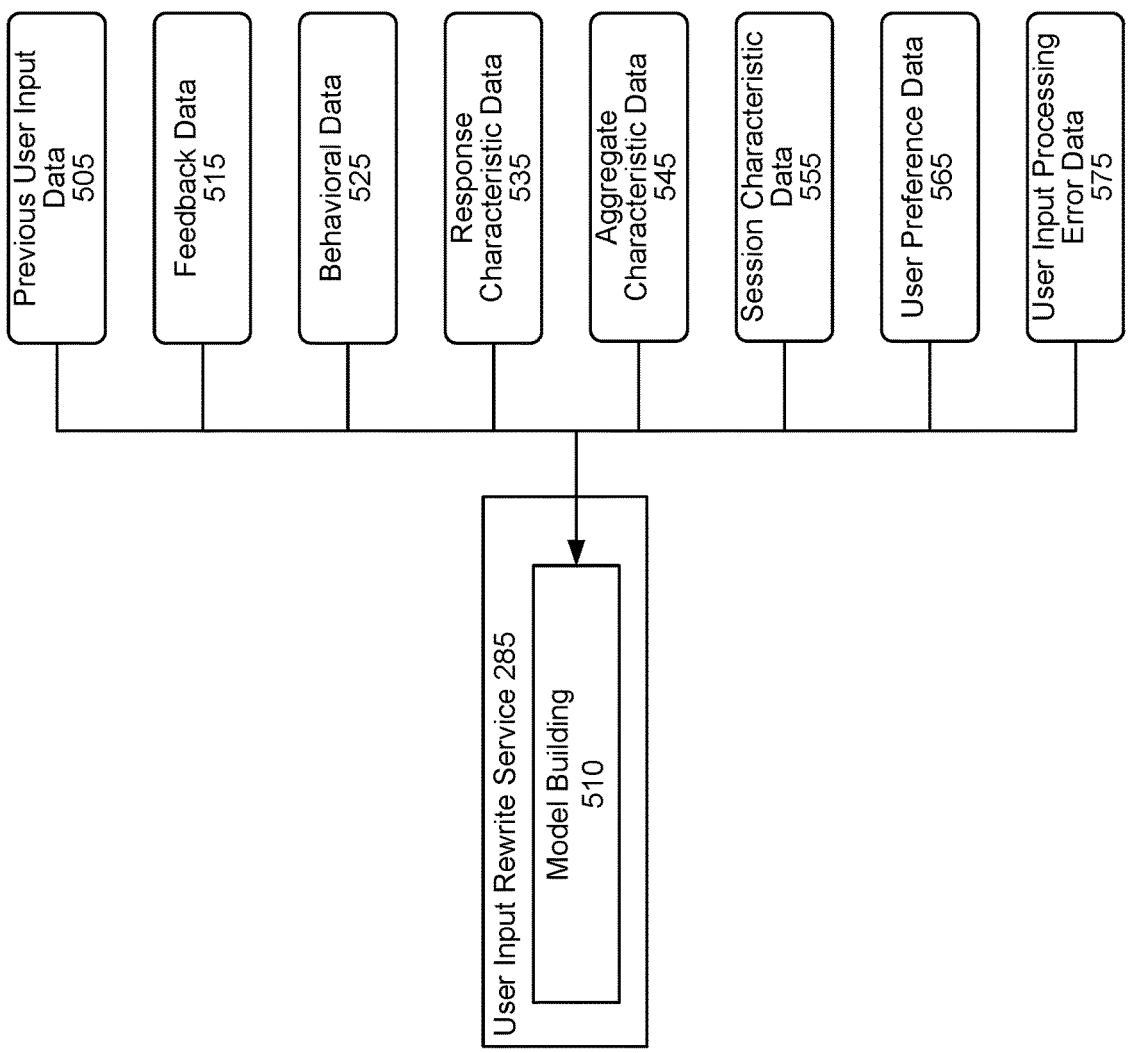
FIG. 5 is a conceptual diagram illustrating how a machine learning model(s) may be trained to determine when a user input should be rewritten according to embodiments of the present disclosure.

The server(s) 120 may include a user input rewrite service 285. The user input rewrite service 285 may include a model building component 510 (as illustrated in FIG. 5). The model building component 510 may train one or more machine learning models to determine when user inputs should be rewritten.

One skilled in the art will appreciate that the model building component 510 is merely illustrative, and that the user input rewrite service 285 may also or additionally include one or more other components for rewriting user inputs. For example, the user input rewrite service 285 may include one or more components that build one or more graphs and/or one or more rules for determining when user inputs should be rewritten.

The model building component 510 may train the one or more machine learning models during offline operations.

The model building component 510 may train the one or more machine learning models using various data.

The trained one or more machine learning models may be configured to output, for a given user input, a value representing a confidence that the user input should be rewritten. The value may be a scalar value from, for example, 1 to 5 (e.g., comprising the integers 1, 2, 3, 4, and 5). In an example, a value of "1" may represent a lowest confidence that a user input should be rewritten. In another example, a value of "5" may represent a highest confidence that a user input should be rewritten. In other examples, the value may be a binned value (e.g., corresponding to high, medium, or low).

Data input to the model building component 510 may include output of the ASR component 250 (e.g., ASR hypotheses), output of the NLU component 260 (e.g., NLU hypotheses), audio data 211, a time at which a user input was received by the system, barge-in data (e.g., data representing detection of a wakeword while the system is outputting content believed responsive to a previous user input), data representing an action performed in response to a previous user input, data representing a time since a most recent user input was received by the system from a particular user and/or device, data representing explicit user feedback, data representing implicit user feedback, data representing a number of user profiles associated with a given user input, etc.

Data input to the model building component 510 may include data representing a length of NLU processing, data representing a number of barge-ins received with respect to a particular action performed in response to a particular user input, data representing a diversity of intents generated for a particular user input, data indicating a number of turns in a particular dialog, data representing user input rephrasing (e.g., data representing that a user input corresponds to a rephrasing of a previous user input), etc.

As used herein, a "dialog" may correspond to various user inputs and system outputs. When the server(s) 120 receives a user input, the server(s) 120 may associate the data (e.g., audio data or text data) representing the user input with a session identifier. The session identifier may be associated with various speech processing data (e.g., an intent indicator(s), a category of skill to be invoked in response to the user input, etc.). When the system invokes a skill, the system may send the session identifier to the skill in addition to NLU results data. If the skill outputs data for presentment to the user, the skill may associate the data with the session identifier. The foregoing is illustrative and, thus, one skilled in the art will appreciate that a session identifier may be used to track data transmitted between various components of the system. A user input and corresponding action performed by a system may be referred to as a dialog "turn."

The model building component 510 may at least partially train one or more machine learning models using previous user input data 505. The previous user input data 505 may be represented as audio data, an ASR hypothesis, and/or an NLU hypotheses. The model building component 510 may expand an ASR hypothesis and/or NLU hypothesis to more accurately reflect a corresponding user input. For example, if an ASR hypothesis corresponds to "play Adele," the model building component 510 may expand the ASR hypothesis to correspond to "play music by Adele." For further example, if an NLU hypothesis includes an intent indicator corresponding to <Play> and a resolved slot corresponding to {artistname: Adele}, the model building component 510 may rewrite the NLU hypothesis to include an intent indicator corresponding to <PlayMusic> and a resolved slot corresponding to {artistname: Adele}. The model building component 510 may use instances of original and rewritten ASR hypotheses and/or NLU hypotheses to at least partially train at least one machine learning model to determine when user inputs should be rewritten.

The model building component 510 may at least partially train a machine learning model(s) using feedback data 515. The feedback data 515 may represent explicit user feedback, such as user ratings, spoken or textual user inputs, etc. The feedback data 515 may also represent sentiment data. Sentiment data may comprise positive, negative, and neutral feedback captured in spoken and textual user inputs. Sentiment data may include expressed frustration or satisfaction using polarized language (e.g., positive or negative expression). For example, if a user says "you are awesome!", sentiment data may reflect user satisfaction. Sentiment data may be captured during runtime operations. In various examples, sentiment data may be identified by comparing input data to known sentiment data (e.g., stored in a table or other data structure).

The model building component 510 may at least partially train a machine learning model(s) using behavioral data 525. Behavioral data 525 may represent one or more characteristics of one or more user inputs. In at least some examples, behavioral data 525 and/or feedback data 515 may represent user sentiment regarding a user's interaction with the system. Behavioral data 515 may include user input rephrasing data (e.g., implicit user feedback). User input rephrasing data may represent similarities between consecutive user inputs received from a user during a dialog. Accordingly, user input rephrasing represents examples where users rephrase a particular input when the system does not understand the user input correctly the first time.

The behavior data 525 may include intent and slot repetition data. Similar to user input rephrasing data, intent and slot repetition data may represent the repetition of intents (with associated slots) such as when the system does not interpret the user input correctly the first time.

The behavioral data 525 may include barge-in data. Barge-in data may represent instances when the system detects a wakeword while the system is performing an action believed responsive to a user input (e.g., the user interrupts or "barges in" with a subsequent user input while the system is performing an action).

The behavioral data 525 may include termination data. Termination data may represent instances when a user instructs the system to stop what the system is currently doing. For example, the system may be performing an action (such as outputting music) and the user may state "stop!" or the like.

The behavioral data 525 may include user question data. User question data may represent scenarios in which a user inquires why the system has performed a particular action. For example, a user may provide an input corresponding to "why did you say that" or the like.

The behavioral data 525 may include confirmation and/or negation data. Confirmation data may represent scenarios when users confirm suggestions from the system. For example, the system may suggest a particular song and the user may say "yes" or "of course" or some other confirmation utterance. Negation data represents scenarios where the user negates or responds negatively to a suggestion.

The behavioral data 525 may include duration data that may represent a time difference between consecutive user inputs. Behavioral data 525 may include length of speech data that may indicate the length of time that a user input lasts.

The behavioral data 525 may include filler word data. Filler word data may indicate the presence of filler words (e.g., "umm", "ahh", "well", etc.) in user speech.

The model building component 510 may at least partially train a machine learning model(s) using response characteristic data 535. Response characteristic data 535 may include coherence data representing a degree of coherence between a response of the system and the user input for the same turn. In an example, if a response of the system and the user input are related to the same question, an indication of coherence for the turn may be sent to model building component 510.

The response characteristic data 535 may include response length data. Response length data may represent a length of the system's response to a user input.

The response characteristic data 535 may include apology data. Apology data represents instances in which the system apologizes. For example, if the user requests an answer to a question and the system responds "I am sorry; I don't know the answer to that question," or the like, apology data may be generated and sent to the model building component 510.

The response characteristic data 535 may include affirmation and/or negation data. Affirmation data may represent system responses such as "Yes", "Absolutely", "Sure", etc. Negation data may represent system responses such as "No", "I don't know", "I don't understand", etc.

The response characteristic data 535 may include filler word data. Filler word data may represent the presence of filler words (e.g., "umm", "ahh", "well", etc.) in system responses.

The response characteristic data 535 may include confirmation request data. Confirmation request data may represent scenarios in which the system seeks to confirm a user selection and/or user intent. For example, the user may request the playing of a Song A. The system may be unable to locate Song A and may ask "Did you mean Song B?". An indication of such a confirmation request may be represented by response characteristic data 535.

The model building component 510 may at least partially train a machine learning model(s) using aggregate characteristic data 545. Aggregate characteristic data 545 may include user input frequency data, intent frequency data, and/or slot frequency data. User input frequency data may represent the frequency of a particular user input for a particular user (or multiple users). Intent frequency data may represent the frequency of a particular intent determined for a single user (or multiple users). Slot frequency data may represent the frequency of slots corresponding to a particular user's (or multiple users') inputs.

In at least some examples, the aggregate characteristic data 545 may include data comprising a ratio of user input frequency to the number of unique users. The aggregate characteristic data 545 may include data representing a popularity (e.g., a score) of a user input, intent, and/or slot over one or more users and/or over a particular time period.

The model building component 510 may at least partially train a machine learning model(s) using session characteristic data 555. The session characteristic data 555 may include dialog length data, which may comprise the current number of turns in a dialog session between a user and the system. In at least some examples, for a skill implemented by a skill server(s) 225, a dialog session may commence upon a user invoking the skill and may end when the session with the skill is terminated (e.g., through user termination or through a session timeout). In at least some examples, for a skill 290 implemented by the server(s) 120, a dialog session may commence upon a user initiating a dialog with the system (e.g., by uttering a wakeword followed by user input). In the context of a skill 290 implemented by the server(s) 120, the dialog session may end after a pre-defined amount of time (e.g., after 45 seconds, or some other amount of time, having elapsed since commencement of the dialog session).

The session characteristic data 555 may include data representing a total number of times a barge-in occurs during a dialog session.

The session characteristic data 555 may include intent diversity data for a dialog session. Intent diversity data may represent the percentage of distinct intents invoked in a dialog session relative to the total number of intents invoked during the dialog session. For example, if during a particular dialog session, a user invokes three separate instances of the same intent, the intent diversity data may reflect that ⅓ of the intents were distinct. In at least some examples, intent diversity data may indicate whether or not a user was satisfied with a particular interaction. Determining whether a user is satisfied with their interactions with a system may be more difficult relative to determining that the user is frustrated. When a user receives a satisfactory response, the user may take one of a diverse set of actions, such as leave the conversation, continue the dialog, leave explicit positive feedback, etc. Intent diversity data is the percentage of distinct intents in a dialog session. Accordingly, in at least some examples, higher intent diversity during a dialog session may indicate that the user is satisfied. For example, a user continuing dialog in a given dialog session and covering a plurality of different intents within the dialog session may positively correlate with high user satisfaction.

The model building component 510 may at least partially train a machine learning model(s) using user preference data 565. User preference data 565 may represent average dialog session length for a given user, intent and slot data (e.g., popularity) for a given user, etc. The user preference data 565 may represent the amount of time a user has been actively using the system (e.g., using a particular skill). The user preference data 565 may represent the average number of turns per dialog session for a particular user. The user preference data 565 may represent the average number of turns for a particular skill for a user. In general, user preference data 565 may correlate dialog session length and/or number of turns per dialog session to particular users. As a result, in at least some examples, users that tend to have shorter dialog sessions and/or fewer turns per dialog session are not necessarily assumed to be unsatisfied with their interactions with a system based on the relative brevity of their interactions therewith. Similarly, a user associated with user preference data 565 that indicates that the user tends to have longer dialog sessions with the system may not necessarily be deemed to be satisfied with their interactions with the system's responses based on the relative lengthiness of their interactions therewith. The user preference data 565 may be represented as a personal graph.

The model building component 510 may at least partially train a machine learning model(s) using user input processing error data 575. User input processing error data 575 may include ASR processing confidence values, NLU processing confidence values, response-error data, turn-by-turn error data, NLU error probability (e.g., the probability of an error by the NLU component 260), ASR error probability (e.g., the probability of an error in output text from the ASR component 250), etc. Response-error data may represent the system was unable to process a particular user input. Turn-by-turn error data may represent if there is a system error in user input processing components.

Data input to the model building component 510 may be associated with data representing when the data was generated. The model building component 510 may use such data to at least partially train the at least one machine learning model, as older data may be weighted less than newer data.

The following data may favor user input rewriting: presence of apology and negation in system response, high probability of intent and/or slot recognition error by the NLU component 260, barge-ins, empty (null) response to user inputs by the system, user termination of a session, similarity between consecutive user inputs, number of barge-ins in a current session, negative sentiment in user inputs, the system asking a question, and intent and slot repetition in user inputs. The aforementioned data is not exhaustive.

The following data may favor not rewriting a user input: low probability of speech recognition error, longer dialog length, high intent diversity, coherence between user input and system response, longer user utterances, user continuing after saying "stop", user asking a question, user input rephrasing, and the system providing affirmative responses. The aforementioned data is not exhaustive.

The model building component 510 may also train one or more machine learning models to rewrite user inputs. These one or more machine learning models may the same as the model(s) trained to determine when a user input should be rewritten, or they may be different.

The model building component 510 may train the one or more machine learning models to rewrite user inputs using text data representing original user inputs (that resulted in incorrect actions being performed by the system) and text data representing corresponding rephrases of the original user inputs. Such text data may correspond to ASR hypotheses of the original and rephrased user inputs. The model building component 510 may limit such training to include only rephrases that are associated with "correct" actions being performed by the system (e.g., are associated with positive user feedback, etc.).

The model building component 510 may use phonetic similarly to train the one or more machine learning model(s) to rewrite user inputs. For example, the model building component 510 may train the model(s) based on linguistic structures and common language patterns. Such training may enable the model(s), at runtime, to rewrite user inputs that include user errors (e.g., due to slips of the tongue).

The model building component 510 may have access to NLU hypotheses associated with original user inputs (that resulted in incorrect actions being performed by the system) and rephrased user inputs. Thus, when the model(s) is used at runtime, they system may rewrite a user input and associate the rewritten user input with a NLU hypothesis. This may prevent at least some NLU processing from needing to be performed on the rewritten user input.

Data used to train the one or more machine learning models may be labeled with respect to a user identifier (representing a user associated with the data). As such, one skilled in the art will appreciate that the trained machine learning model(s) may be wholly generic to various users of the system; wholly specific to a particular user; or may include a portion trained with respect to various users of the system, and one or more portions that are individualized to specific users of the system.

The model building component 510 may generate one or more trained models (e.g., resulting from the retraining of a trained model(s)) on a periodic basis (e.g., once every few hours, once a day, etc.).

A machine learning model may be trained and operated according to various machine learning techniques. Such techniques may include, for example, neural networks (such as deep neural networks and/or recurrent neural networks), inference engines, trained classifiers, HMMs, Markov chains, probabilistic graphical models (PGMs), etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train models, including backpropagation, statistical learning, supervised learning, semi-supervised learning, stochastic learning, or other known techniques.

Figure 6:
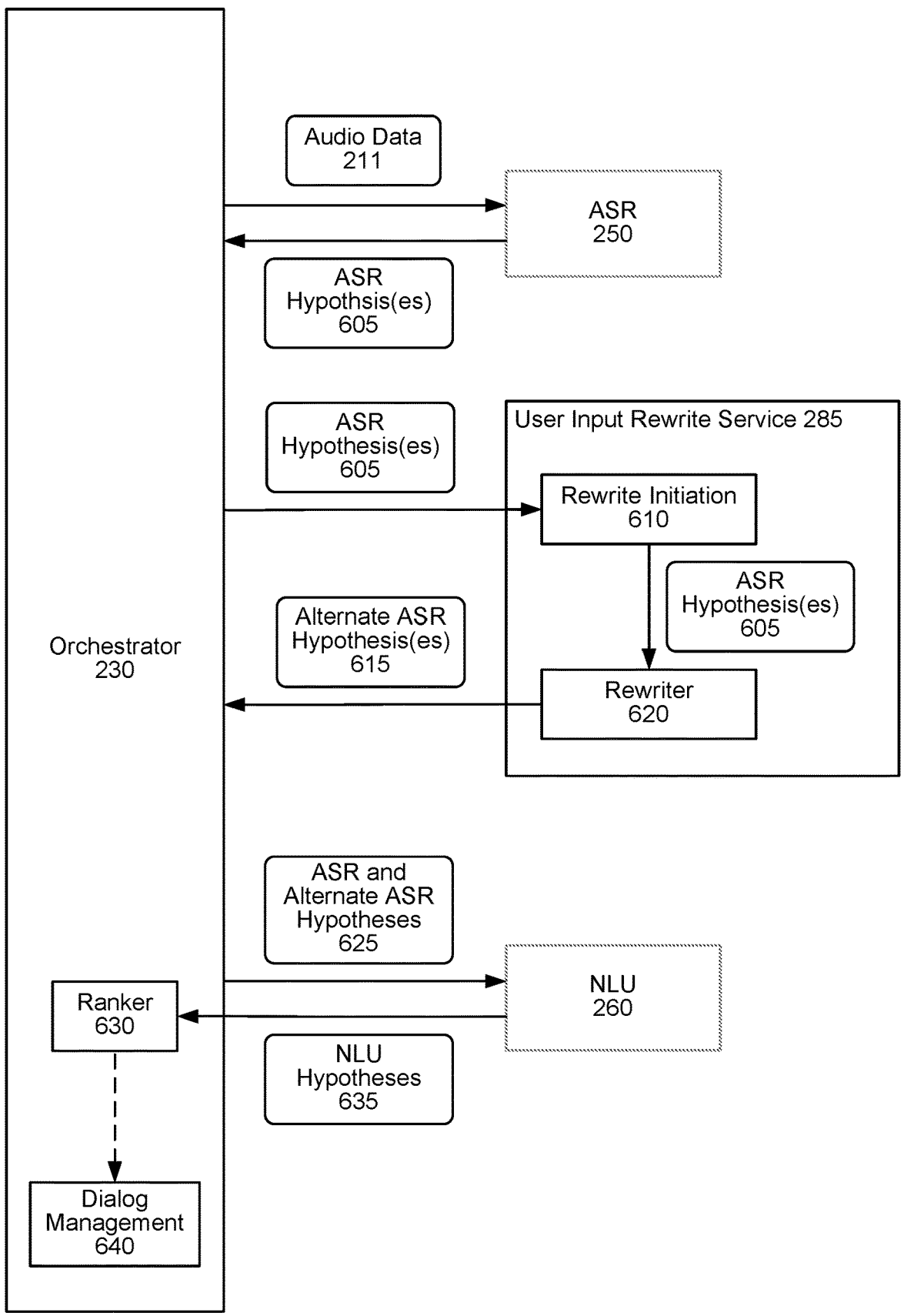
FIG. 6 is a conceptual diagram illustrating how user inputs may be rewritten at runtime according to embodiments of the present disclosure.

The one or more trained machine learning models, generated by the model building component 510, may be implemented at runtime to determine when and how to rewrite a user input (as illustrated in FIG. 6). If a user input is received as audio 11 (e.g., is a spoken user input), the orchestrator component 230 may send audio data 211, representing the audio 11, to the ASR component 250. The ASR component 250 may transcribe the audio data 211 into one or more ASR hypotheses 605, which the ASR component 250 may send to the orchestrator component 230.

The orchestrator component 230 may send one or more ASR hypotheses 605 to a rewrite initiation component 610 of the user input rewrite service 285. The rewrite initiation component 610 may process the ASR hypothesis(es) 605 to determine whether one or more of the ASR hypothesis(es) 605 should be rewritten.

The rewrite initiation component 610 may implement the trained one or more machine learning models (generated by the model building component 510) to determine whether the present user input should be rewritten. For example, the rewrite initiation component 610 may process an ASR hypothesis to determine whether the ASR hypothesis is similar to previous user inputs that were rephrased, associated with negative user feedback, etc.

The rewrite initiation component 610 may process with respect to a user identifier associated with the ASR hypothesis(es) 605. For example, the rewrite initiation component 610 may receive a user identifier (corresponding to a user profile associated with the present user input). The rewrite initiation component 610 may implement a portion of the trained machine learning model(s), trained using data associated with the user identifier, to determine if the ASR hypothesis(es) 605 should be rewritten.

If the rewrite initiation component 610 determines the ASR hypothesis(es) 605 should not be rewritten, the rewrite initiation component 610 may cause the ASR hypothesis(es) 605 to be sent to the NLU component 260 (not illustrated). If the rewrite initiation component 610 determines at least one of the ASR hypothesis(es) 605 should be rewritten, the rewrite initiation component 610 sends the at least one of the ASR hypothesis(es) 605 to a rewriter component 620 of the user input rewrite service 285.

At least some systems may be configured to determine every user input should be rewritten. In at least some systems, this configuration may be too computationally costly. Thus, the rewrite initiation component 610 may be configured to determine a percentage of user inputs should be rewritten.

The rewriter component 620 may implement one or more trained machine learning models (generated by the model building component 510 as described above) to generate one or more alternate ASR hypotheses 615 from an ASR hypothesis 605 input thereto. The rewriter component 620 may be configured to generate as many alternate ASR hypotheses 615 for a single ASR hypothesis 605 as possible, with the caveat that the rewriter component 620 should have at least a minimum confidence that the alternate ASR hypotheses 615 wouldn't be triggered for rewriting if they were processed by the rewrite initiation component 610. At least some systems may be configured to generate no more than a maximum number of alternate ASR hypotheses 615 for a given ASR hypothesis 605 (e.g., since the number of alternate ASR hypotheses 615 generated corresponds to computing costs attributed to NLU processing of the user input).

The rewriter component 620 may consider personalized context information for a user (associated with the user input) when determining how to rewrite a user input. For example, an electronic calendar associated with the user's profile may include an entry representing the user is going on vacation to Alaska. If the user asks the system "what is the weather in Petersburg," the system may determine "Petersburg" is ambiguous. Using the electronic calendar information, the system could rewrite the user input to correspond to "what is the weather in Petersburg, Alaska."

The rewriter component 620 may generate two or more functionally equivalent alternate ASR hypotheses. When this occurs, the rewriter component 620 may be configured to send only one of the functionally equivalent alternate ASR hypotheses to the orchestrator component 230. This prevents NLU processing from being performed with respect to functionally equivalent data, which may decrease latency.

The rewriter component 620 may perform various types of rewrites (as illustrated in FIG. 7). The rewriter component 620 may narrow down an ASR hypothesis 605 such that the alternate ASR hypothesis(es) 615 generated therefrom is/are narrower than the ASR hypothesis 605. The rewriter component 620 may generalize an ASR hypothesis 605 such that the alternate ASR hypothesis(es) 615 generated therefrom is/are broader than the ASR hypothesis 605. The rewriter component 620 may fix slip of the tongue issues in an ASR hypothesis 605 such that the alternate ASR hypothesis(es) 615 generated therefrom fix one or more errors in the hypothesis 605. The rewriter component 620 may reformulate an ASR hypothesis 605 such that the alternate ASR hypothesis(es) 615 generated therefrom is/are "clearer" than the ASR hypothesis 605. Other types of rewrites are possible.

Referring back to FIG. 6, the rewriter component 620 may send the alternate ASR hypothesis(es) 615 to the orchestrator component 230. The orchestrator component 230 may send the ASR hypothesis(es) and alternate ASR hypothesis(es) (collectively illustrated as 625) to the NLU component 260.

The rewriter component 620 may generate a respective confidence value for each alternate ASR hypothesis. Such a confidence value may represent the rewriter component 620's confidence that the alternate ASR hypothesis represents a more beneficial ASR hypothesis than the ASR hypothesis from which the alternate ASR hypothesis was generated. Such confidence value may be a numeric value (e.g., on a scale of 0-10 or some other scale) or a binned value (e.g., high, medium, low, etc.). Numerical values may correspond to binned values (e.g., a low value may correspond to numeric values of 0-3, a medium value may correspond to numeric values of 4-6, and a high value may corresponds to numeric values of 7-10). In at least some examples, the rewriter component 620 may be configured to only output alternate ASR hypotheses corresponding to confidence values that satisfy a threshold confidence value. In at least some examples, if none of the alternate ASR hypotheses satisfy the threshold confidence value, the rewriter component 620 may output the single alternate ASR hypothesis having the highest confidence value.

One skilled in the art will appreciate that some or all of the types of data considered by the model building component 510 to generate the one or more trained machine learning models may be considered by the rewriter component 620 at runtime. For example, the rewriter component 620 may consider data representing a sentiment of the user input, information representing one or more previous turns of a dialog, which skills have been enabled with respect to a user profile, which smart home devices have been enabled with respect to a user profile, etc.

When a user input is received by a device 110, the device 110 may generate a user input identifier corresponding to the user input. The system may maintain a record of processing performed with respect to the user input using the user input identifier. For example, the audio data 211 may be associated with the user input identifier when the orchestrator component 230 sends the audio data 211 to the ASR component 250; the ASR hypothesis(es) 605 may be associated with the user input identifier when the ASR component 250 sends the ASR hypothesis(es) 605 to the orchestrator component 230; the ASR hypothesis(es) 605 may be associated with the user input identifier when the orchestrator component 250 sends the ASR hypothesis(es) 605 to the rewrite initiation component 610; the ASR hypothesis(es) 605 may be associated with the user input identifier when the rewrite initiation component 610 sends the ASR hypothesis(es) 605 to the rewriter component 620; the alternate ASR hypothesis(es) 615 may be associated with the user input identifier when the rewriter component 620 sends the alternate ASR hypothesis(es) 615 to the orchestrator component 230; the hypotheses 625 may be associated with the user input identifier when the orchestrator component 230 sends the hypotheses 625 to the NLU component 260; etc.

The orchestrator component 230 may cause the ASR hypothesis(es) 605 and associated user input identifier to be stored after the orchestrator component 230 receives same from the ASR component 250. When the orchestrator component 230 receives the alternate ASR hypothesis(es) 615 associated with the user identifier, the orchestrator component 230 may recall the ASR hypothesis(es) 605, associated with the same user input identifier, from storage and send the hypotheses 625 to the NLU component 260.

Alternatively, the rewriter component 620 may send the alternate ASR hypothesis(es) 615 and the ASR hypothesis(es) 605 to the orchestrator component 230, and the orchestrator component 230 may simply send the received hypotheses 625 to the NLU component 260. This may prevent the orchestrator component 230 from needing to maintain a record of ASR hypotheses and corresponding user input identifiers.

The NLU component 260 may perform NLU processing with respect to the received hypotheses 625. The NLU component 260 may process two or more of the hypotheses 625 at least partially in parallel.

The NLU component 260 may output multiple NLU hypotheses 635. Each NLU hypothesis may be associated with a value representing a confidence that the NLU hypothesis represents the user input. An NLU hypothesis corresponding to an alternate ASR hypothesis 615 may be associated with a flag representing the NLU hypothesis was generated from an alternate ASR hypothesis 615. Such flagging may be beneficial when, for example, NLU hypotheses generated from ASR and alternate ASR hypotheses are substantially similar or identical.

The NLU hypotheses 635 may be sent to a ranker component 630. As illustrated, the ranker component 630 is implemented by the orchestrator component 230. However, one skilled in the art will appreciate that the ranker component 630 may be implemented in other areas of the system, such as within the ASR component 250, the NLU component 260, or the user input rewrite service 286, for example. Moreover, one ranker component 630 may be implemented, or multiple ranker component 630's may be implemented.

The ranker component 630 ranks the NLU hypotheses 635 (generated from ASR hypotheses 605 and alternate ASR hypotheses 615) using various data, and selects the top ranking NLU hypothesis as being the best representation of the user input. While the goal of the rewrite component 620 is to generate accurate representations of the user input, the goal of the ranker component 630 is to select the best representation.

The rewrite initiation component 610 may generate a value representing the rewrite initiation component 610's confidence that one or more ASR hypotheses 605 should be rewritten. The ranker component 630 may consider the rewrite initiation component 610 generated confidence value. For example, the higher the rewrite initiation component 610 generated confidence value, the more weight the ranker component 630 may assign to the NLU hypotheses associated with flags representing the NLU hypotheses were generated from alternate ASR hypotheses. In other words, the more confidence the rewrite initiation component 610 is that the user input should be rewritten, the more weight the ranker component 630 may assign to NLU hypotheses associated with alternate ASR hypotheses generated by the rewriter component 620. In at least some implementations, the ranker component 630 may generate a rewrite confidence value, rather than considering the value generated by the rewrite initiation component 610.

The NLU component 260 may assign a respective NLU confidence value to each NLU hypothesis. The ranker component 630 may be configured to weight NLU hypotheses (generated from ASR hypotheses 605) more than NLU hypotheses (generated from alternate ASR hypotheses 615) when the NLU confidence values are close (e.g., within a threshold deviation).

In least some examples, the ranker component 630 may not be able to disambiguate the NLU hypotheses to a level at which the ranker component 630 is confident in selecting a single NLU hypothesis for downstream processing. That is, a deviation between a score of a scoring NLU hypothesis and a score of a next-top-scoring NLU hypothesis may not be large enough. When this occurs, the ranker component 630 may cause a dialog management component 640 to be invoked.

The dialog management component 640 may be configured to engage a user, through a user interface, for the purpose of the user selecting which interpretation of the user input is most accurate (and should be used for downstream processing). This user interface may be implemented as a VUI and/or a GUI. For example, the dialog management component 640 may cause a device 110 to display text representing different ASR hypotheses (e.g., both output by the ASR component 250 and the user input rewrite service 285) and/or may cause a device 110 to output audio requesting the user indicate (audibly or via a tactile input) which ASR hypothesis most correctly represents the user input.

As described above, the user input rewrite service 285 may receive one or more ASR hypotheses 605 when the user input is a spoken user input. One skilled in the art will appreciate that the user input rewrite service 285 may receive text data (representing a text based user input) and may process as described above with the text based user input without departing from the present disclosure.

Figure 8:
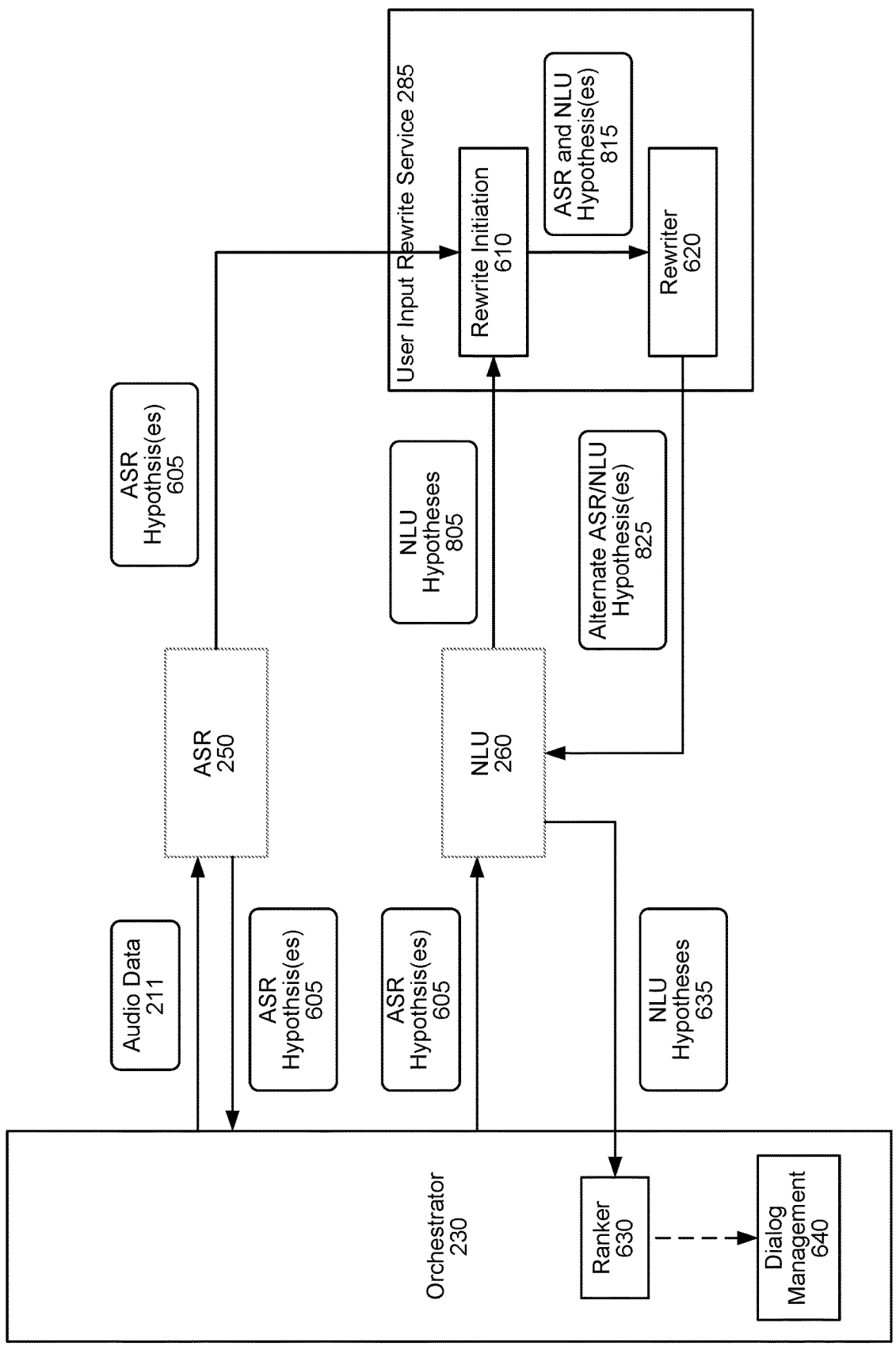
FIG. 8 is a conceptual diagram illustrating how user inputs may be rewritten at runtime according to embodiments of the present disclosure.

As described above, the user input rewrite service 285 is implemented pre-NLU in a user input processing pipeline. Alternatively, the user input rewrite service 285 may be implemented at least partially in parallel or post-NLU (as illustrated in FIG. 8). A decision on where in the user input processing pipeline to implement the user input rewrite service 285 may be based, at least in part, on latency considerations since, as described below with respect to FIG. 8, implementing the user input rewrite service 285 in parallel with or after NLU may result in the NLU component 260 being called more than once with respect to the same user input.

One or more ASR hypotheses 605 (or text data as received from a user device, representing a text based user input) may be sent to the NLU component 260. The NLU component 260 may generate NLU hypotheses 805 representing the ASR hypothesis(es) 605 (or other received text data), and may send same to the rewrite initiation component 610.

The rewrite initiation component 610 may process with respect to the ASR hypothesis(es) 605 (or other text data representing a text based user input) and the NLU hypotheses 805 to determine whether the user input should be rewritten. If the rewrite initiation component 610 determines the user input should be rewritten (e.g., determines the ASR hypothesis(es) 605 or text data representing a text based user input should be rewritten), the rewrite initiation component 610 may send the ASR hypothesis(es) (or other text data) to be rewritten along with its corresponding NLU hypothesis (collectively illustrated as 815) to the rewriter component 620.

The rewriter component 620 may generate at least one alternate ASR hypothesis for a received ASR hypothesis (or other text data). The rewriter component 620 may, in at least some examples, generate a corresponding alternate NLU hypothesis based on a received NLU hypothesis. For example, the rewriter component 620 may populate one or more slots of an NLU hypothesis with different values, may delete one or more slots from an NLU hypothesis, may add one or more slots (and optionally corresponding values) to the NLU hypothesis, etc. The rewriter component 620 may send the alternate ASR and/or NLU hypotheses (collectively illustrated as 825) to the NLU component 260.

The NLU component 260 may perform NLU processing with respect to the received alternate hypothesis(es) 825 to generate further NLU hypotheses. The NLU component 260 may output all (or a portion of) the NLU hypotheses 635, generated for the present user input, to the ranker component 630, which may process as described above with respect to FIG. 6.

In the example of FIG. 8, the rewrite initiation component 610 and/or the rewriter component 620 may implement one or more machine learning models that are trained with respect to specific types of skills (e.g., music skills, video skills, smart home skills, etc.). In an example, a trained machine learning model implemented by the rewrite initiation component 610 and/or the rewriter component 620 may include a portion trained with respect to all types of skills, and various other portions that are each trained with respect to a specific type of skill.

The rewrite initiation component 610 and/or the rewriter component 620, as implemented in FIG. 8, may be configured to consider the various kinds of data at runtime described above with respect to FIG. 6.

Figure 9:
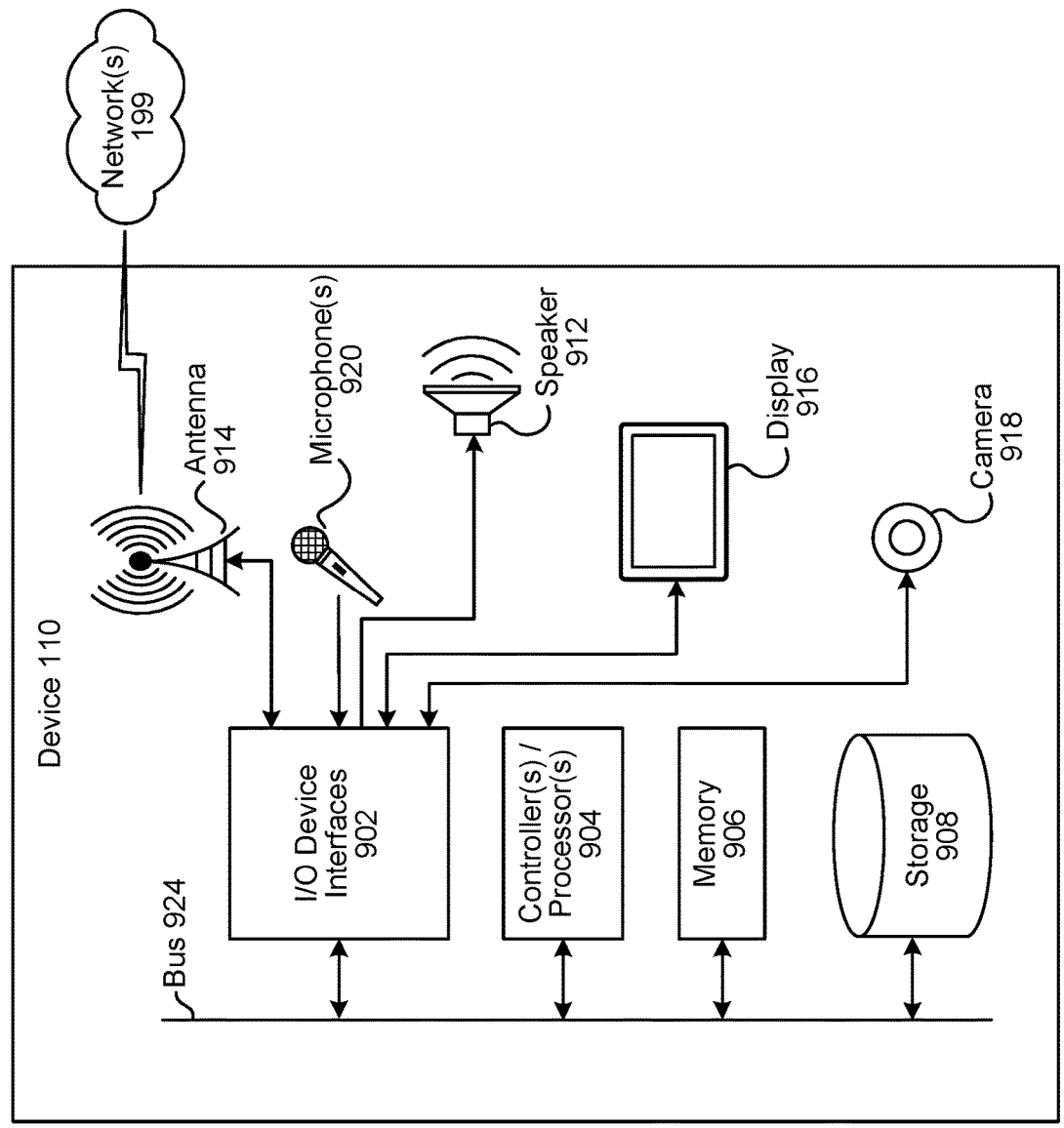
FIG. 9 is a block diagram conceptually illustrating example components of a device according to embodiments of the present disclosure.
Figure 10:
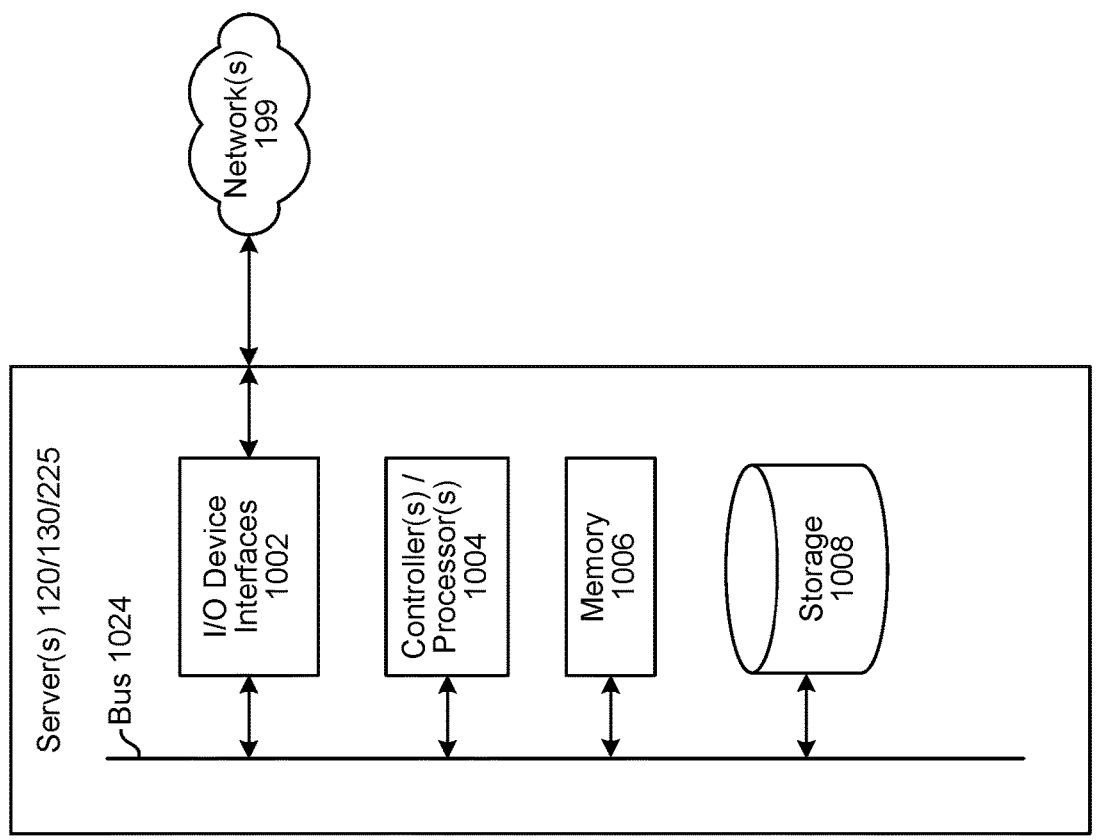
FIG. 10 is a block diagram conceptually illustrating example components of a server according to embodiments of the present disclosure.

FIG. 9 is a block diagram conceptually illustrating a device 110 that may be used with the system. FIG. 10 is a block diagram conceptually illustrating example components of a remote device, such as the server(s) 120, which may assist with ASR processing, NLU processing, etc., and the skill server(s) 225. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/225) may be included in the system, such as one or more servers 120 for performing ASR processing, one or more servers 120 for performing NLU processing, one or more skill server(s) 225 for performing actions responsive to user inputs, etc. In operation, each of these servers (or groups of servers) may include computer-readable and computer-executable instructions that reside on the respective device (120/225), as will be discussed further below.

Each of these devices (110/120/225) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (902/1002).

Computer instructions for operating each device (110/120/225) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/225) includes input/output device interfaces (902/1002). A variety of components may be connected through the input/output device interfaces (902/1002), as will be discussed further below. Additionally, each device (110/120/225) may include an address/data bus (924/1024) for conveying data among components of the respective device. Each component within a device (110/120/225) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the server(s) 120, or the skill server(s) 225 may include their own dedicated processors, memory, and/or storage. Alternatively, one or more of the components of the device(s) 110, the server(s) 120, or the skill server(s) 225 may utilize the I/O interfaces (902/1002), processor(s) (904/1004), memory (906/1006), and/or storage (908/1008) of the device(s) 110 server(s) 120, or the skill server(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the server(s) 120, and the skill server(s) 225, as described herein, are illustrative, and may be located as a stand-alone device or may be included, in whole or in part, as a component of a larger device or system.

Figure 11:
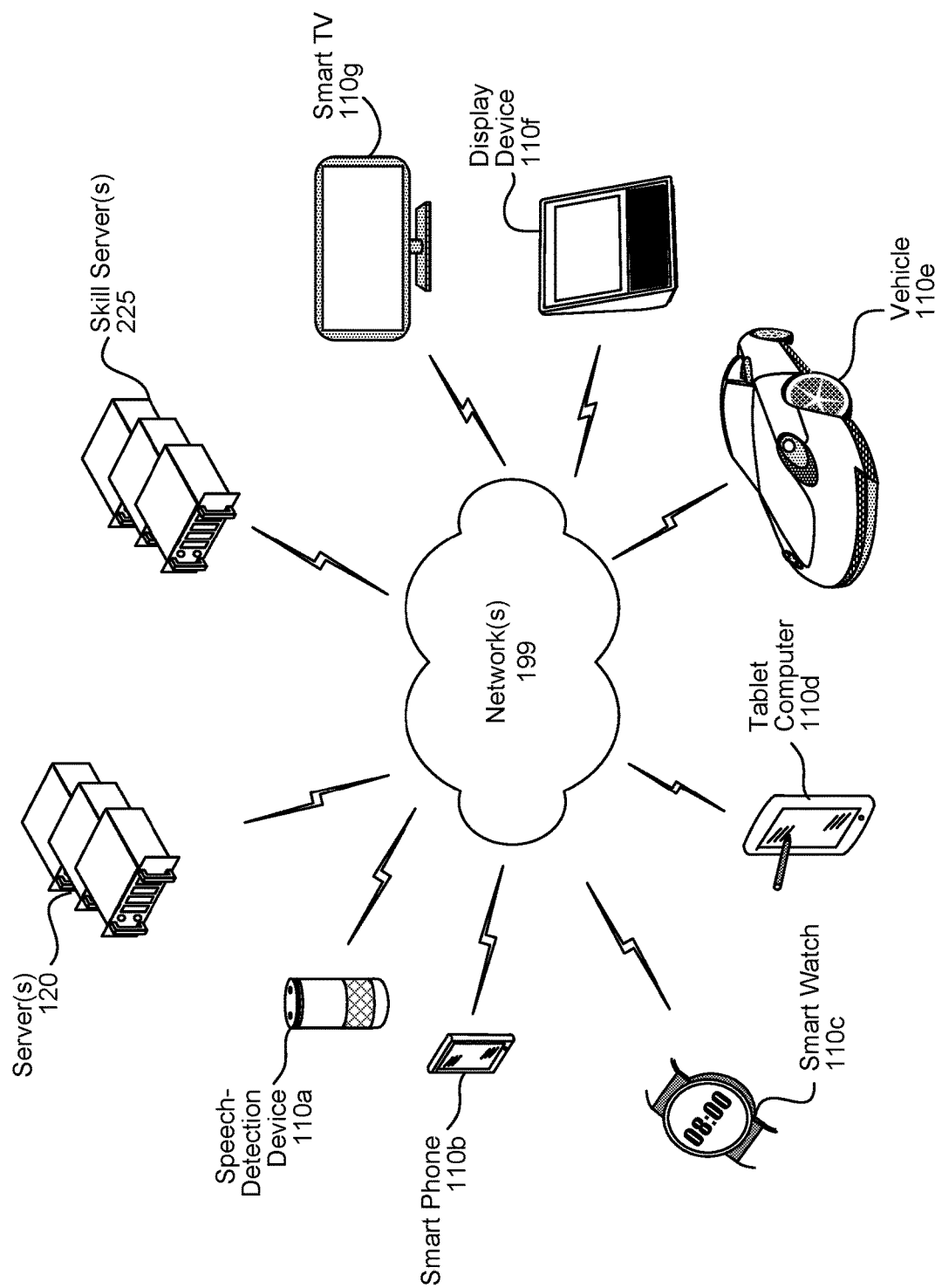
FIG. 11 illustrates an example of a computer network for use with the speech processing system.

As illustrated in FIG. 11, multiple devices (110a-110g, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the skill server(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a first device, audio data representing speech;
performing automatic speech recognition (ASR) processing on the audio data to generate first text data corresponding to a first natural language representation of the speech;
determining the first natural language representation corresponds to a first previous user input;
prior to performing natural language understanding (NLU) processing with respect to the first natural language representation, determining the first previous user input is associated with a first previous system response, the first previous system response being associated with negative user feedback data;
in response to determining the first previous system response is associated with the negative user feedback data and prior to performing NLU processing, generating a second natural language representation of the speech, the second natural language representation corresponding to a second previous user input associated with a second previous system response, the second previous system response being associated with positive user feedback data;
performing NLU processing on the first natural language representation to generate a first NLU hypothesis;

performing NLU processing on the second natural language representation to generate a second NLU hypothesis; and
causing at least a first processing component to execute with respect to at least one of the first NLU hypothesis or the second NLU hypothesis.

2. The method of claim 1, further comprising:
storing first data associating the second natural language representation with an indicator representing that the second natural language representation corresponds to an alternate natural language representation of the speech;
generating a first confidence value for the first NLU hypothesis;
based at least in part on the first data, generating a second confidence value for the second NLU hypothesis; and
based at least in part on the first confidence value and the second confidence value, causing the at least first processing component to execute with respect to the second NLU hypothesis.

3. The method of claim 1, further comprising:
determining a user profile identifier associated with the audio data;
determining a first portion, of at least a first trained machine learning model, corresponding to the user profile identifier;
determining, using the first portion, a third previous user input corresponding to a rephrasing of the first previous user input; and
generating the second natural language representation based at least in part on the third previous user input.

4. The method of claim 1, further comprising:
determining the second natural language representation corresponds to a third previous user input;
determining the third previous user input corresponds to a rephrasing of the first previous user input;
determining a third NLU hypothesis previously generated with respect to the third previous user input; and
causing the at least first processing component to execute with respect to at least one of the first NLU hypothesis, the second NLU hypothesis, or the third NLU hypothesis.

5. A method, comprising:
receiving a first natural language representation of a user input;
determining, prior to performing natural language understanding (NLU) processing with respect to the first natural language representation, that natural language representation corresponds to a first previous user input associated with first previous output data, the first previous output data being associated with negative user feedback data;
generating, in response to the first previous output data being associated with the negative user feedback data, a second natural language representation of the user input;
performing NLU processing on the second natural language representation to generate a first NLU hypothesis; and
causing at least a first processing component to execute with respect to the first NLU hypothesis.

6. The method of claim 5, further comprising:
receiving, from a first device, audio data representing the user input; and
performing automatic speech recognition (ASR) processing on the audio data to generate the first natural language representation, the first natural language representation corresponding to a first ASR hypothesis,
wherein generating the second natural language representation comprises generating an alternate ASR hypothesis.

7. The method of claim 5, further comprising:
storing first data associating the second natural language representation with an indicator representing that the second natural language representation corresponds to an alternate natural language representation of the user input;
generating, based at least in part on the first data, a confidence value for the first NLU hypothesis; and
causing, based at least in part on the confidence value, the at least first processing component to execute with respect to the first NLU hypothesis.

8. The method of claim 5, further comprising:
determining a user profile identifier associated with the first natural language representation;
determining at least a portion, of at least a first trained machine learning model, corresponding to the user profile identifier;
determining, using the at least a portion of the at least first trained machine learning model, that the first previous user input is associated with a second previous user input corresponding to a rephrasing of the first previous user input; and
generating the second natural language representation to correspond to the second previous user input.

9. The method of claim 8, further comprising:
determining a second NLU hypothesis previously generated with respect to the second previous user input; and
causing the at least first processing component to execute with respect to the second NLU hypothesis.

10. The method of claim 5, further comprising:
performing NLU processing on the first natural language representation to generate a second NLU hypothesis;
determining at least a second processing component configured to execute with respect to the second NLU hypothesis;
determining a first portion, of at least first trained machine learning model, associated with the at least second processing component; and
generating the second natural language representation using the first portion.

11. The method of claim 5, further comprising:
generating a confidence value representing a likelihood that the first natural language representation corresponds to the first previous user input; and
causing based at least in part on the confidence value, the at least first processing component to execute with respect to the first NLU hypothesis.

12. The method of claim 5, further comprising:
using at least one of a set of rules or a statistical model to determine processing of the first natural language representation corresponds to the first previous user input.

13. A system, comprising:
at least one processor; and
at least one memory comprising instructions that, when executed by the at least one processor, cause the system to:
receive a first natural language representation of a user input;
determine, prior to performing natural language understanding (NLU) processing with respect to the first natural language representation, that the first natural language representation corresponds to a first previous user input associated with first previous output data, the first previous output data being associated with negative user feedback data;

generate, in response to the first previous output data being associated with the negative user feedback data, a second natural language representation of the user input;

perform NLU processing on the second natural language representation to generate a first NLU hypothesis; and cause at least a first processing component to execute with respect to the first NLU hypothesis.

14. The system of claim 13, wherein the at least one memory further comprises instructions that, when executed by the at least one processor, further cause the system to:

receive, from a first device, audio data representing the user input; and perform automatic speech recognition (ASR) processing on the audio data to generate the first natural language representation, the first natural language representation corresponding to a first ASR hypothesis, wherein the second natural language representation corresponds to an alternate ASR hypothesis.

15. The system of claim 13, wherein the at least one memory further comprises instructions that, when executed by the at least one processor, further cause the system to:

store first data associating the second natural language representation with an indicator representing that the second natural language representation corresponds to an alternate natural language representation of the user input;

generate, based at least in part on the first data, a confidence value for the first NLU hypothesis; and cause, based at least in part on the confidence value, the at least first processing component to execute with respect to the first NLU hypothesis.

16. The system of claim 13, wherein the at least one memory further comprises instructions that, when executed by the at least one processor, further cause the system to:

determine a user profile identifier associated with the first natural language representation;

determine at least a portion, of at least a first trained machine learning model, corresponding to the user profile identifier;

determine, using the at least a portion of the at least first trained machine learning model, that the first previous user input is associated with a second previous user input corresponding to a rephrasing of the first previous user input; and generate the second natural language representation to correspond to the second previous user input.

17. The system of claim 16, wherein the at least one memory further comprises instructions that, when executed by the at least one processor, further cause the system to:

determine a second NLU hypothesis previously generated with respect to the second previous user input; and cause the at least first processing component to execute with respect to the second NLU hypothesis.

18. The system of claim 13, wherein the at least one memory further comprises instructions that, when executed by the at least one processor, further cause the system to:

perform NLU processing on the first natural language representation to generate a second NLU hypothesis;

determine at least a second processing component configured to execute with respect to the second NLU hypothesis;

determine a first portion, of at least first trained machine learning model, associated with the at least second processing component; and generate the second natural language representation using the first portion.

19. The system of claim 13, wherein the at least one memory further comprises instructions that, when executed by the at least one processor, further cause the system to:

generate a confidence value representing a likelihood that the first natural language representation corresponds to the first previous user input; and cause, based at least in part on the confidence value, the at least first processing component to execute with respect to the first NLU hypothesis.

20. The system of claim 13, wherein the at least one memory further comprises instructions that, when executed by the at least one processor, further cause the system to:

use at least one of a set of rules or a statistical model to determine processing of the first natural language representation corresponds to the first previous user input.

* * * * *